(12) United States Patent
Noguchi

(10) Patent No.: US 10,551,962 B2
(45) Date of Patent: *Feb. 4, 2020

(54) TOUCH DETECTION DEVICE, DISPLAY DEVICE WITH TOUCH DETECTION FUNCTION, AND COVERING MEMBER

(71) Applicant: Japan Display Inc., Tokyo (JP)

(72) Inventor: Koji Noguchi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/163,819

(22) Filed: Oct. 18, 2018

(65) Prior Publication Data
US 2019/0050107 A1 Feb. 14, 2019

Related U.S. Application Data

(63) Continuation of application No. 15/346,093, filed on Nov. 8, 2016, now Pat. No. 10,126,863.

(30) Foreign Application Priority Data

Nov. 27, 2015 (JP) ................................. 2015-232252

(51) Int. Cl.
*G06F 3/041* (2006.01)
*G06F 3/044* (2006.01)
(Continued)

(52) U.S. Cl.
CPC ............ *G06F 3/0416* (2013.01); *G06F 3/044* (2013.01); *G06F 3/0412* (2013.01);
(Continued)

(58) Field of Classification Search
CPC ...... G06F 3/0416; G06F 3/044; G06F 3/0412; G06F 3/3648
See application file for complete search history.

(56) References Cited

U.S. PATENT DOCUMENTS 10,126,863 B2 * 11/2018 Noguchi ............... G06F 3/0416
2006/0238517 A1 10/2006 King
(Continued)

FOREIGN PATENT DOCUMENTS

CN 101644979 2/2010
CN 102422247 4/2012
(Continued)

OTHER PUBLICATIONS

Japanese Office Action dated Apr. 2, 2019 in corresponding Japanese Application No. 2015-232252.
(Continued)

*Primary Examiner* — Liliana Cerullo
(74) *Attorney, Agent, or Firm* — K&L Gates LLP

(57) ABSTRACT

According to an aspect, a touch detection device includes: a first substrate; a second substrate opposed to the first substrate; a cover base material opposed to the second substrate; a plurality of first electrodes overlapping a display region on a plane parallel with the first substrate; and a second electrode arranged at the cover base material and overlapping a frame region outside the display region. Proximity or contact of an object with respect to the frame region is detected based on capacitance between the first electrodes and the second electrode. The second electrode extends along a side of the frame region.

8 Claims, 30 Drawing Sheets

(51) Int. Cl.
*G09G 3/36* (2006.01)
*G02F 1/1333* (2006.01)
*G02F 1/1335* (2006.01)
*G02F 1/1343* (2006.01)
*G02F 1/1362* (2006.01)
*G02F 1/1368* (2006.01)

(52) U.S. Cl.
CPC ......... *G09G 3/3648* (2013.01); *G02F 1/1368* (2013.01); *G02F 1/13338* (2013.01); *G02F 1/13439* (2013.01); *G02F 1/133514* (2013.01); *G02F 1/134309* (2013.01); *G02F 1/136286* (2013.01); *G02F 2201/52* (2013.01); *G06F 2203/04101* (2013.01); *G06F 2203/04102* (2013.01); *G09G 2354/00* (2013.01)

(56) References Cited

U.S. PATENT DOCUMENTS

| | | |
|---|---|---|
| 2010/0026656 A1 | 2/2010 | Hotelling et al. |
| 2011/0227847 A1 | 9/2011 | Yoshiyama |
| 2012/0032917 A1 | 2/2012 | Yamaguchi |
| 2012/0044199 A1* | 2/2012 | Karpin .................. G06F 3/0416 345/174 |
| 2012/0154408 A1 | 6/2012 | Yukawa et al. |
| 2012/0162584 A1 | 6/2012 | Chang |
| 2014/0146013 A1 | 5/2014 | Noguchi et al. |
| 2014/0168151 A1 | 6/2014 | Noguchi et al. |
| 2014/0253501 A1 | 9/2014 | Noguchi et al. |
| 2014/0292718 A1 | 10/2014 | Noguchi et al. |
| 2015/0220208 A1 | 8/2015 | Noguchi et al. |

FOREIGN PATENT DOCUMENTS

| | | |
|---|---|---|
| CN | 103870081 | 6/2014 |
| CN | 104035636 | 9/2014 |
| JP | 2009-244958 | 10/2009 |
| JP | 2011-198009 | 10/2011 |
| JP | 2012-133453 | 7/2012 |
| JP | 2014-174760 | 9/2014 |
| JP | 2015-164033 | 9/2015 |
| WO | 2010/126072 | 11/2010 |
| WO | 2015/159590 | 10/2015 |
| WO | 2016/056516 | 4/2016 |

OTHER PUBLICATIONS

Chinese Office Action dated Jul. 1, 2019 in corresponding Chinese Application No. 2016110422973.

* cited by examiner

TOUCH DETECTION DEVICE, DISPLAY DEVICE WITH TOUCH DETECTION FUNCTION, AND COVERING MEMBER

CROSS-REFERENCE TO RELATED APPLICATIONS

This application is a continuation application of U.S. patent application Ser. No. 15/346,093, filed on Nov. 8, 2016, which application claims priority from Japanese Application No. 2015-232252, filed on Nov. 27, 2015, the contents of which are incorporated by reference herein in its entirety.

BACKGROUND

1. Technical Field

The present invention relates to a touch detection device, a display device with a touch detection function, and a covering member.

2. Description of the Related Art

In recent years, attention has been paid to a touch detection device that can detect an external proximity object, what is called a touch panel. The touch panel is mounted on a display device such as a liquid crystal display device, or integrated with the display device to be used as a display device with a touch detection function. In such a display device with a touch detection function, a button having an input function may be arranged in a frame region of a peripheral part of a display region in the display device with a touch detection function.

Such an input button may be designed as a component separated from the touch panel of the display region to be combined therewith. Alternatively, known is a technology of integrating the input button with the frame region of the touch panel or the display device. Japanese Patent Application Laid-open Publication No. 2009-244958 discloses a display device with a touch sensor in which a detection electrode for a sensor is arranged in a frame region of a TFT substrate. A plurality of detection electrodes for a sensor separated from each other are arranged in the frame region surrounding a display region.

However, wiring, a drive circuit, and the like coupled with an electrode may be arranged in the frame region of the substrate in some cases, so that a width of the frame region may be increased when the detection electrode for a sensor is arranged therein.

For the foregoing reasons, there is a need for a touch detection device, a display device with a touch detection function, and a covering member for preventing the frame region from being increased and having an excellent picture frame detection performance.

SUMMARY

According to an aspect, a touch detection device includes: a first substrate; a second substrate opposed to the first substrate; a cover base material opposed to the second substrate; a plurality of first electrodes overlapping a display region on a plane parallel with the first substrate; and a second electrode arranged at the cover base material and overlapping a frame region outside the display region. Proximity or contact of an object with respect to the frame region is detected based on capacitance between the first electrodes and the second electrode. The second electrode extends along a side of the frame region.

According to another aspect, a display device with a touch detection function includes: the touch detection device; a plurality of pixel electrodes arranged in a matrix in the display region on a plane parallel with the first substrate; and a display function layer that exhibits an image display function in the display region.

According to another aspect, a covering member arranged at a surface side of a touch detection device, the covering member includes: a cover base material; and an electrode that overlaps a frame region outside the display region in a plan view on a plane parallel with the cover base material, and extends along a side of an outer circumference of the display region.

Additional features and advantages are described herein, and will be apparent from the following Detailed Description and the figures.

DETAILED DESCRIPTION

Figure 1:
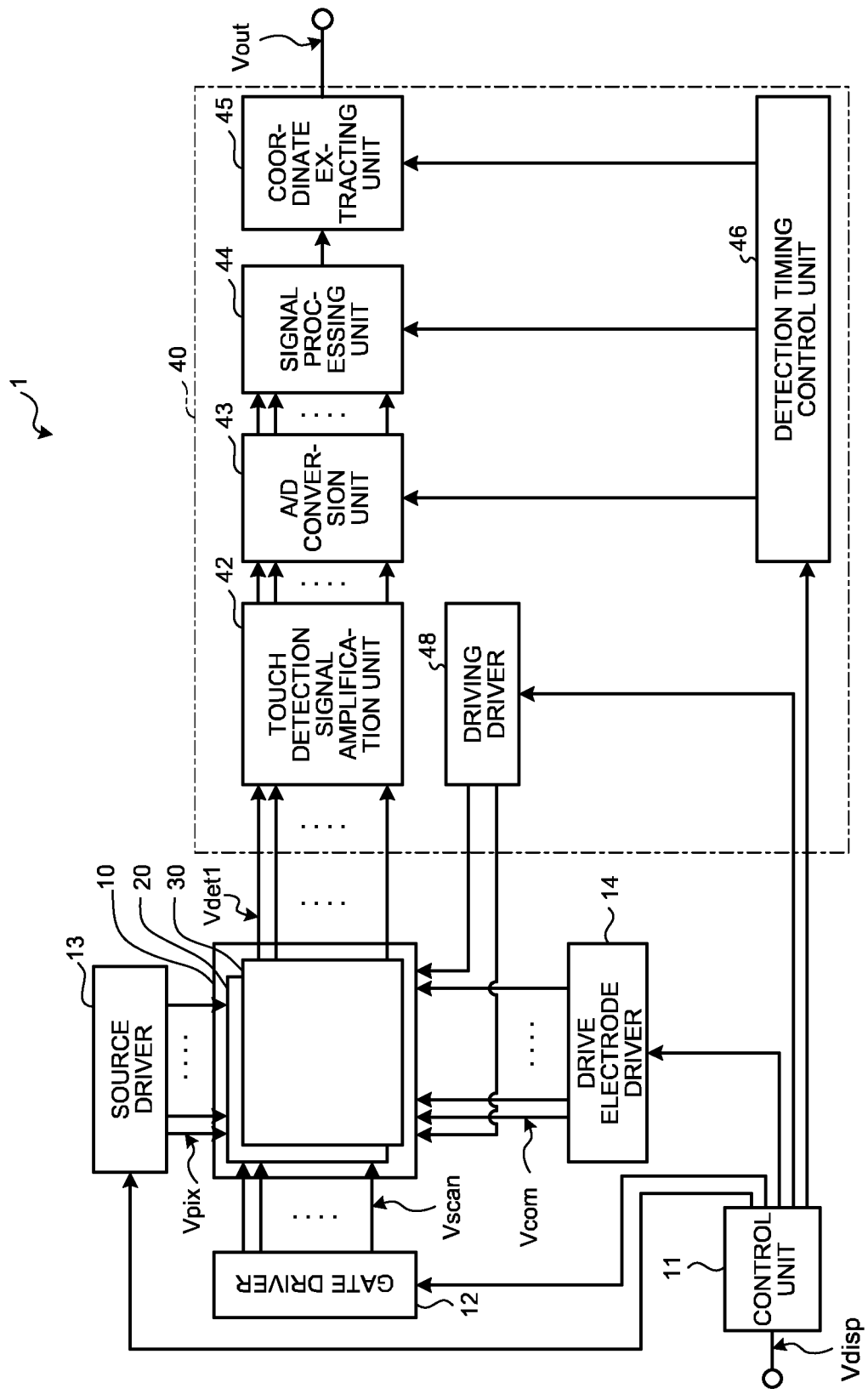
FIG. 1 is a block diagram illustrating a configuration example of a display device with a touch detection function according to a first embodiment.

Embodiments of the present application will be described below in detail with reference to the drawings.

The present invention is not limited to the embodiment described below. Components described below include a component that is easily conceivable by those skilled in the art and substantially the same component. The components described below can be appropriately combined. The disclosure is merely an example, and the present invention naturally encompasses an appropriate modification maintaining the gist of the invention that is easily conceivable by those skilled in the art. To further clarify the description, a width, a thickness, a shape, and the like of each component may be schematically illustrated in the drawings as compared with an actual aspect. However, this is merely an example and interpretation of the invention is not limited thereto. The same element as that described in the drawing that has already been discussed is denoted by the same reference numeral through the description and the drawings, and detailed description thereof will not be repeated in some cases.

In this disclosure, when an element is described as being "on" another element, the element can be directly on the other element, or there can be one or more elements between the element and the other element.

First Embodiment

FIG. 1 is a block diagram illustrating a configuration example of a display device 1 with a touch detection function according to a first embodiment. As illustrated in FIG. 1, the display device 1 with a touch detection function includes a display unit 10 with a touch detection function, a control unit 11, a gate driver 12, a source driver 13, a drive electrode driver 14, and a touch detection unit 40. In the display device 1 with a touch detection function, a touch detection function is incorporated in the display unit 10 with a touch detection function. The display unit 10 with a touch detection function is a device integrating a display panel 20 including a liquid crystal display element as a display element with a touch panel 30 serving as a touch detection device for detecting a touch input. The display unit 10 with a touch detection function may be what is called an on-cell device in which the touch panel 30 is mounted on the display panel 20. The display panel 20 may be, for example, an organic electroluminescent (EL) display panel. The touch input that is detected by the touch panel 30 includes contact on or proximity to the touch panel 30 performed by an external conductor.

As described later, the display panel 20 sequentially performs scanning for each horizontal line to perform display in accordance with a scanning signal Vscan supplied from the gate driver 12. The control unit 11 is a circuit that supplies a control signal to each of the gate driver 12, the source driver 13, the drive electrode driver 14, and the touch detection unit 40 based on a video signal Vdisp supplied from the outside, thereby controlling these components to operate in synchronization with each other.

The gate driver 12 has a function of sequentially selecting one horizontal line to be a display driving target of the display unit 10 with a touch detection function based on the control signal supplied from the control unit 11.

The source driver 13 is a circuit that supplies a pixel signal Vpix to each sub-pixel SPix (described later) in the display unit 10 with a touch detection function based on the control signal supplied from the control unit 11.

The drive electrode driver 14 is a circuit that supplies a first drive signal Vcom to a first drive electrode COML1 (described later) in the display unit 10 with a touch detection function based on the control signal supplied from the control unit 11.

The touch panel 30 operates based on a basic principle of capacitance touch detection, and performs a touch detection operation using a mutual-capacitive system to detect contact or proximity of an external conductor to a display region. The touch panel 30 may perform the touch detection operation using a self-capacitive system.

The touch detection unit 40 is a circuit that detects whether there is a touch input on or to the touch panel 30 based on the control signal supplied from the control unit 11 and based on a first touch detection signal Vdet1 supplied from the touch panel 30. The touch detection unit 40 obtains coordinates at which the touch input is performed when there is a touch input. The touch detection unit 40 includes a touch detection signal amplification unit 42, an A/D conversion unit 43, a signal processing unit 44, and a coordinate extracting unit 45. A detection timing control unit 46 controls the A/D conversion unit 43, the signal processing unit 44, and the coordinate extracting unit 45 based on the control signal supplied from the control unit 11 such that these components operate in synchronization with each other. The touch detection unit 40 further includes a driving driver 48. The driving driver 48 is a circuit that supplies a second drive signal Vd to second drive electrodes COML2A, COML2B, COML2C, and COML2D, which are described in detail later.

Figure 2:
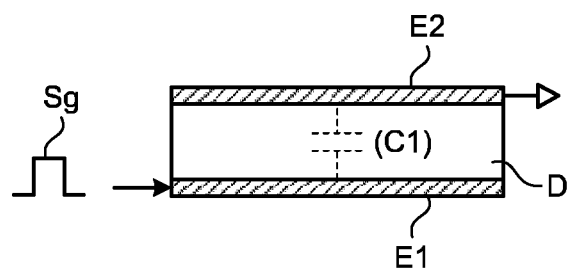
FIG. 2 is an explanatory diagram for explaining a basic principle of mutual-capacitive touch detection and illustrates a state in which a finger is in a non-contact state or a non-proximate state.
Figure 3:
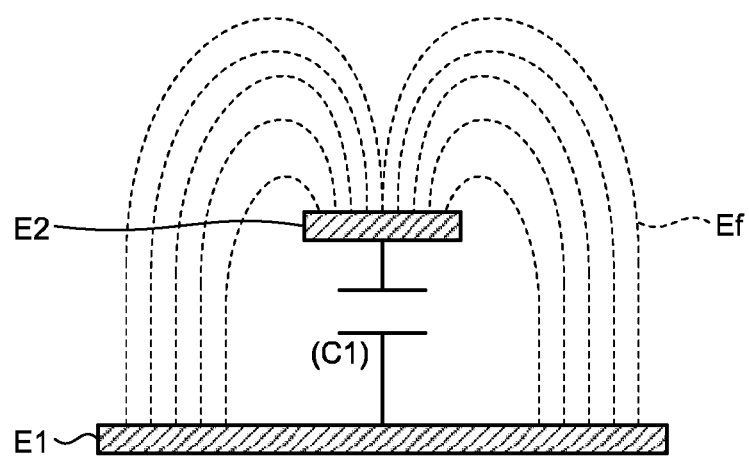
FIG. 3 is an explanatory diagram illustrating an example of a fringe electric field in the state in which the finger is in a non-contact state or a non-proximate state as illustrated in FIG. 2.
Figure 4:
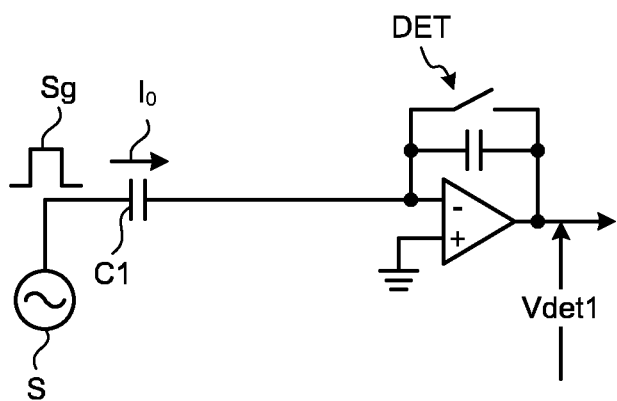
FIG. 4 is an explanatory diagram illustrating an example of an equivalent circuit of the state in which the finger is in a non-contact state or a non-proximate state as illustrated in FIG. 2.
Figure 5:
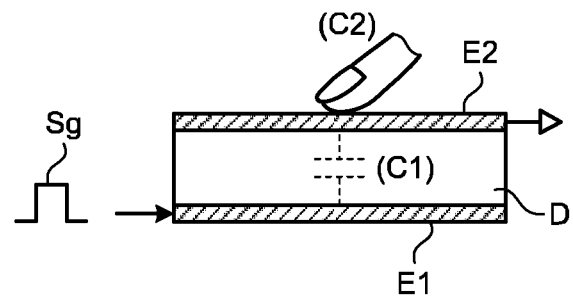
FIG. 5 is an explanatory diagram for explaining the basic principle of mutual-capacitive touch detection and illustrates a state in which the finger is in a contact state or a proximate state.
Figure 6:
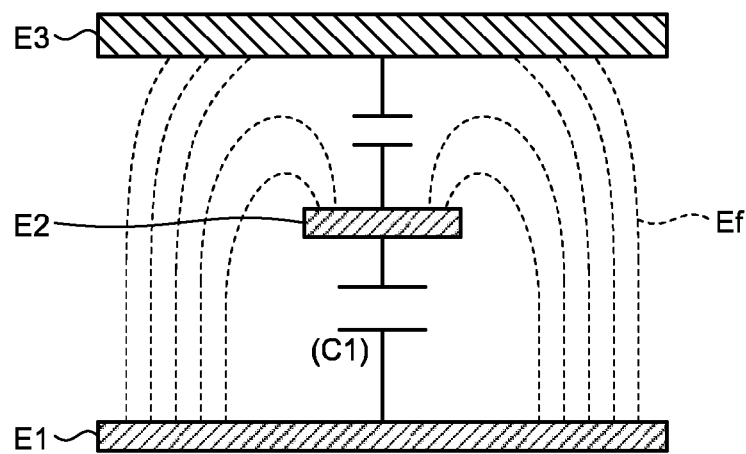
FIG. 6 is an explanatory diagram illustrating an example of a fringe electric field in the state in which the finger is in a contact state or a proximate state as illustrated in FIG. 5.
Figure 7:
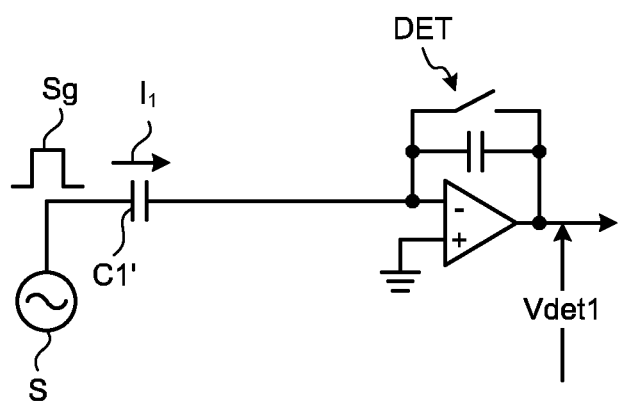
FIG. 7 is an explanatory diagram illustrating an example of an equivalent circuit of the state in which the finger is in a contact state or a proximate state as illustrated in FIG. 5.
Figure 8:
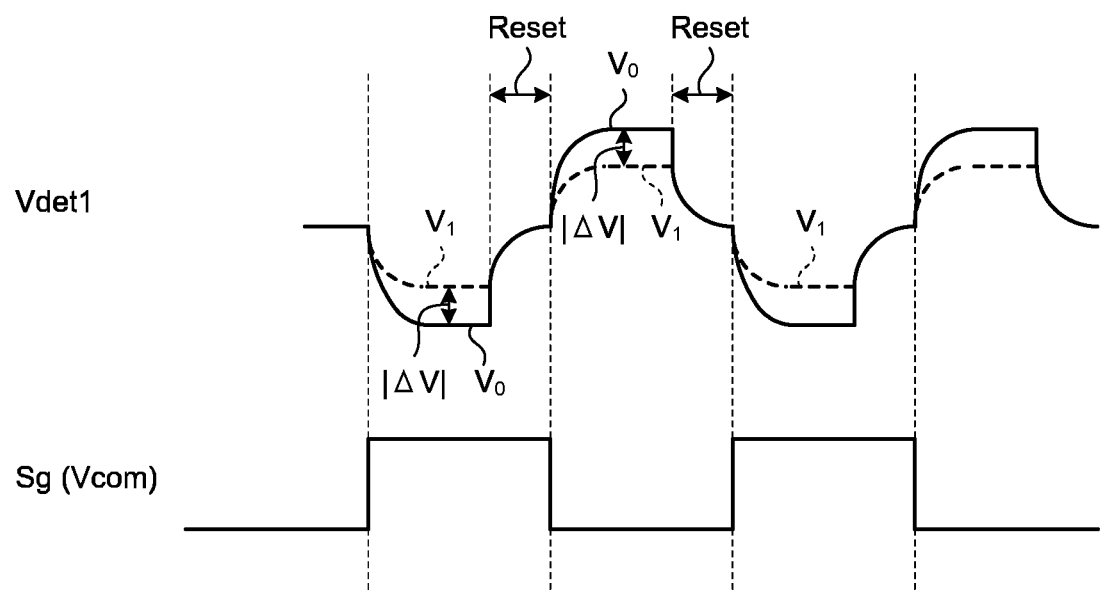
FIG. 8 is a diagram illustrating an example of waveforms of a drive signal and a touch detection signal in mutual-capacitive touch detection.

As described above, the touch panel 30 operates based on the basic principle of capacitance touch detection. With reference to FIGS. 2 to 8, the following describes the basic principle of mutual-capacitive touch detection performed by the display device 1 with a touch detection function according to the present embodiment. FIG. 2 is an explanatory diagram for explaining the basic principle of mutual-capacitive touch detection and illustrates a state in which a finger is in a non-contact state or a non-proximate state. FIG. 3 is an explanatory diagram illustrating an example of a fringe electric field in the state in which the finger is in a non-contact state or a non-proximate state as illustrated in FIG. 2. FIG. 4 is an explanatory diagram illustrating an example of an equivalent circuit of the state in which the finger is in a non-contact state or a non-proximate state as illustrated in FIG. 2. FIG. 5 is an explanatory diagram for explaining the basic principle of mutual-capacitive touch detection and illustrates a state in which the finger is in a contact state or a proximate state. FIG. 6 is an explanatory diagram illustrating an example of the fringe electric field in the state in which the finger is in a contact state or a proximate state as illustrated in FIG. 5. FIG. 7 is an explanatory diagram illustrating an example of an equivalent circuit of the state in which the finger is in the contact state or the proximate state as illustrated in FIG. 5. FIG. 8 is a diagram illustrating an example of waveforms of the drive signal and the touch detection signal. The following describes a case in which a finger is brought into contact with or proximate to the touch panel. Alternatively, for example, an object including a conductor such as a stylus pen may be replaced with the finger.

For example, as illustrated in FIG. 2, a capacitive element C1 includes a pair of electrodes arranged facing each other with a dielectric D interposed therebetween, that is, a drive electrode E1 and a touch detection electrode E2. In the capacitive element C1, as illustrated in FIG. 3, an electric line of force Ef corresponding to a fringe extending from an end of the drive electrode E1 toward an upper surface of the touch detection electrode E2 is generated in addition to an electric line of force (not illustrated) formed between opposing surfaces of the drive electrode E1 and the touch detection electrode E2. As illustrated in FIG. 4, one end of the capacitive element C1 is coupled to an AC signal source (driving signal source) S, and the other end thereof is coupled to a voltage detector DET. The voltage detector DET is, for example, an integrating circuit included in the touch detection signal amplification unit 42 illustrated in FIG. 1.

When an AC rectangular wave Sg having a predetermined frequency (for example, about several kHz to several hundred kHz) is applied to the drive electrode E1 (one end of the capacitive element C1) from the AC signal source S, an output waveform (first touch detection signal Vdet1) as illustrated in FIG. 8 appears via the voltage detector DET coupled to the touch detection electrode E2 (the other end of the capacitive element C1). The AC rectangular wave Sg corresponds to the first drive signal Vcom input from the drive electrode driver 14.

In a state in which the finger is not in contact with or proximate to the touch panel (non-contact state), as illustrated in FIG. 4, a current $I_0$ corresponding to a capacitance value of the capacitive element C1 flows with charge and discharge of the capacitive element C1. The voltage detector DET illustrated in FIG. 4 converts variation in the current $I_0$ corresponding to the AC rectangular wave Sg into variation in voltage (a waveform $V_0$ of a solid line (refer to FIG. 8)).

In a state in which the finger is in contact with or proximate to the touch panel (contact state), as illustrated in FIG. 5, capacitance C2 formed by the finger is in contact with or proximate to the touch detection electrode E2, so that the electric line of force Ef corresponding to a fringe between the drive electrode E1 and the touch detection electrode E2 is shielded as illustrated in FIG. 6. Due to this, as illustrated in FIG. 7, the capacitive element C1 functions as a capacitive element C1' having a capacitance value smaller than the capacitance value in the non-contact state. With reference to the equivalent circuit illustrated in FIG. 7, a current $I_1$ flows through the capacitive element C1'. As illustrated in FIG. 8, the voltage detector DET converts variation in the current $I_1$ corresponding to the AC rectangular wave Sg into variation in voltage (a waveform $V_1$ of a dotted line). In this case, amplitude of the waveform $V_1$ is smaller than that of the waveform $V_0$ described above. Accordingly, an absolute value |ΔV| of a voltage difference between the waveform $V_0$ and the waveform $V_1$ varies depending on influence of a conductor such as a finger that is brought into contact with or proximate to the touch panel from the outside. To accurately detect the absolute value |ΔV| of the voltage difference between the waveform $V_0$ and the waveform $V_1$, it is more preferable to provide, to an operation of the voltage detector DET, a period Reset for resetting charge and discharge of a capacitor in accordance with a frequency of the AC rectangular wave Sg through switching in the circuit.

The touch panel 30 illustrated in FIG. 1 sequentially scans each detection block in accordance with the first drive signal Vcom supplied from the drive electrode driver 14, thereby performing mutual-capacitive touch detection.

The touch panel 30 outputs the first touch detection signal Vdet1 of each detection block via the voltage detector DET illustrated in FIG. 3 or FIG. 5 from a plurality of touch detection electrodes TDL described later. The first touch detection signal Vdet1 is supplied to the touch detection signal amplification unit 42 of the touch detection unit 40.

The touch detection signal amplification unit 42 amplifies the first touch detection signal Vdet1 supplied from the touch panel 30. The touch detection signal amplification unit 42 may include an analog low pass filter (LPF) that removes a high frequency component (noise component) included in the first touch detection signal Vdet1 and outputs the remaining components.

The A/D conversion unit 43 samples each analog signal that is output from the touch detection signal amplification unit 42 at a timing synchronized with the first drive signal Vcom and the second drive signal Vd, and converts the analog signal into a digital signal.

The signal processing unit 44 includes a digital filter that reduces a frequency component (noise component) other than a frequency at which the first drive signal Vcom and the second drive signal Vd are sampled included in the output signal of the A/D conversion unit 43. The signal processing unit 44 is a logic circuit that detects whether there is a touch input on or to the touch panel 30 based on the output signal of the A/D conversion unit 43. The signal processing unit 44 performs processing of extracting only a difference of the detection signal caused by the finger. The signal of the difference caused by the finger corresponds to the absolute value $|\Delta V|$ of the difference between the waveform $V_0$ and the waveform $V_1$ described above. The signal processing unit 44 may perform an arithmetic operation for averaging the absolute value $|\Delta V|$ for each detection block to obtain an average value of the absolute value $|\Delta V|$. Due to this, the signal processing unit 44 can suppress influence of the noise. The signal processing unit 44 compares the detected signal of the difference caused by the finger with a predetermined threshold voltage. If the signal of the difference is smaller than the threshold voltage, the signal processing unit 44 determines that an external proximity object is in the non-contact state. If the signal of the difference is equal to or larger than the threshold voltage, the signal processing unit 44 determines that the external proximity object is in the contact state. In this way, the touch detection unit 40 can perform touch detection.

The coordinate extracting unit 45 is a logic circuit that obtains, when a touch input is detected by the signal processing unit 44, touch panel coordinates at which the touch input is detected. The coordinate extracting unit 45 outputs the touch panel coordinates as a detection signal output Vout. As described above, the display device 1 with a touch detection function according to the present embodiment can detect the touch panel coordinates of the position where a conductor such as a finger is in contact with or proximate to the touch panel 30, based on the basic principle of mutual-capacitive touch detection.

Figure 9:
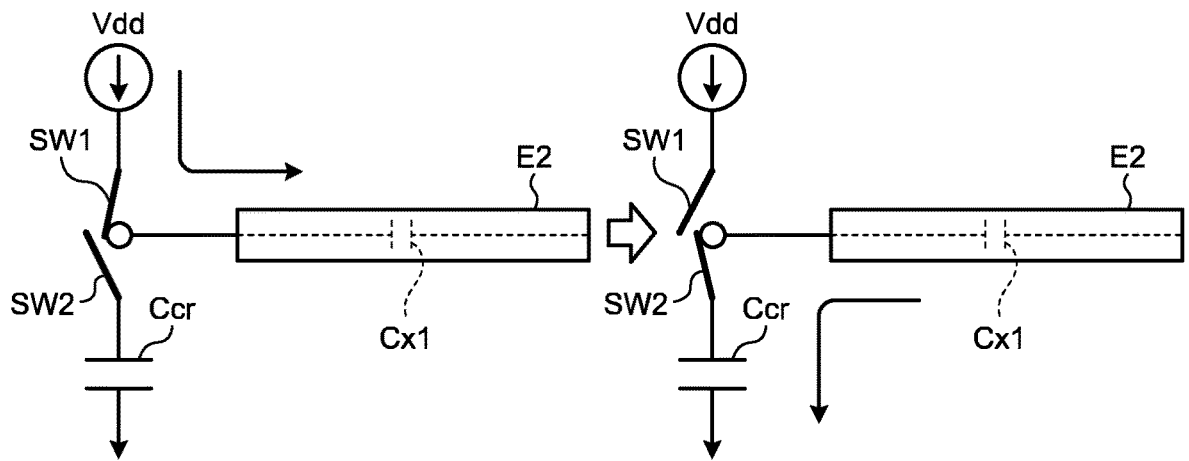
FIG. 9 is an explanatory diagram for explaining a basic principle of self-capacitive touch detection and illustrates the state in which the finger is in a non-contact state or a non-proximate state.
Figure 10:
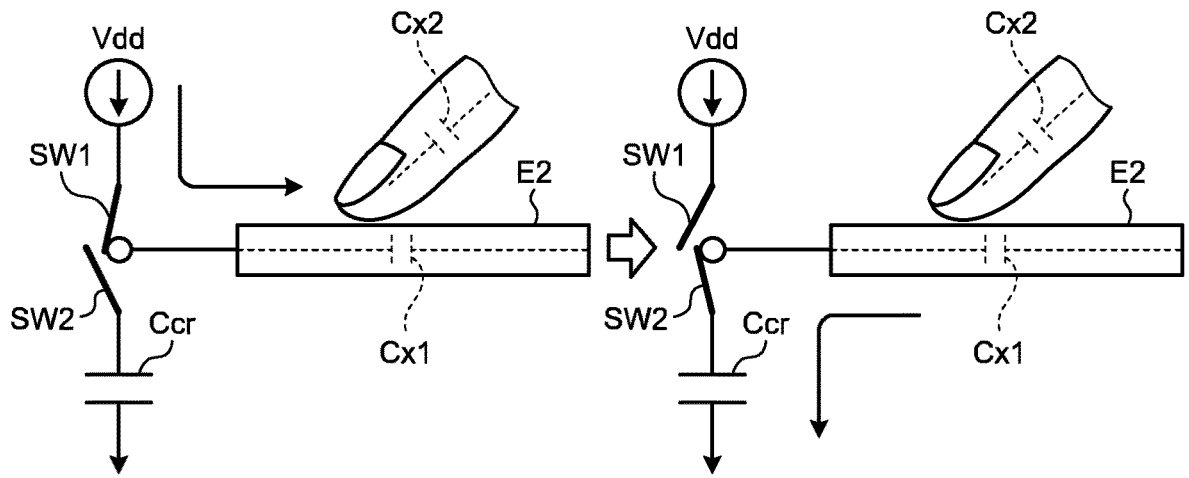
FIG. 10 is an explanatory diagram for explaining the basic principle of self-capacitive touch detection and illustrates the state in which the finger is in a contact state or a proximate state.
Figure 11:
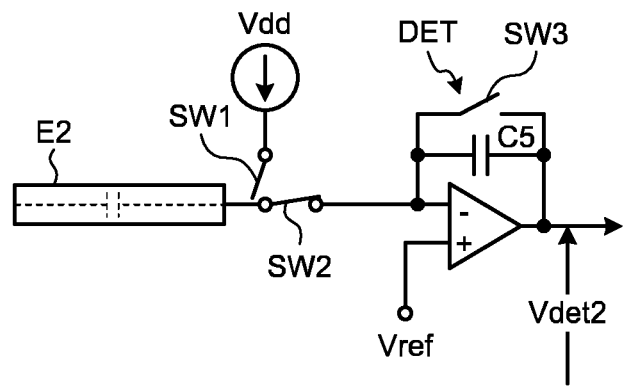
FIG. 11 is an explanatory diagram illustrating an example of an equivalent circuit of self-capacitive touch detection.
Figure 12:
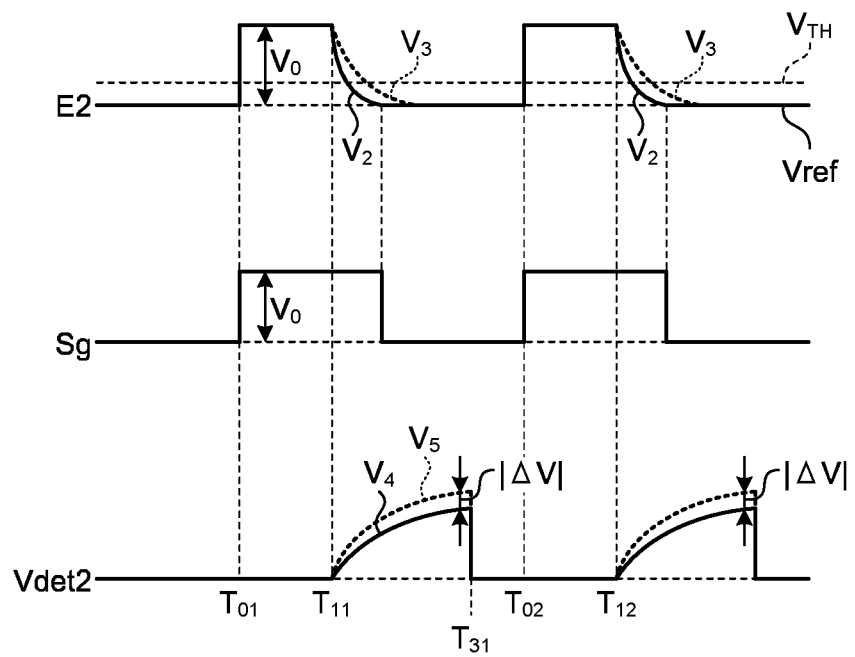
FIG. 12 is a diagram illustrating an example of waveforms of a drive signal and a touch detection signal in self-capacitive touch detection.

Next, the following describes a basic principle of self-capacitive touch detection with reference to FIGS. 9 to 12. FIG. 9 is an explanatory diagram for explaining the basic principle of self-capacitive touch detection and illustrates the state in which the finger is in a non-contact state or a non-proximate state. FIG. 10 is an explanatory diagram for explaining the basic principle of self-capacitive touch detection and illustrates the state in which the finger is in a contact state or a proximate state. FIG. 11 is an explanatory diagram illustrating an example of an equivalent circuit of self-capacitive touch detection. FIG. 12 is a diagram illustrating an example of waveforms of a drive signal and a touch detection signal in self-capacitive touch detection.

The left figure of FIG. 9 illustrates a state in which a power source Vdd is coupled to the touch detection electrode E2 with a switch SW1 set to ON, and the touch detection electrode E2 is not coupled to a capacitor Ccr with a switch SW2 set to OFF when the finger is in a non-contact state or a non-proximate state. In this state, a capacitance Cx1 included in the touch detection electrode E2 is charged. The right figure of FIG. 9 illustrates a state in which the power source Vdd is disconnected from the touch detection electrode E2 with the switch SW1 set to OFF, and the touch detection electrode E2 is coupled to the capacitor Ccr with the switch SW2 set to ON. In this state, an electric charge of the capacitance Cx1 is discharged via the capacitor Ccr.

The left figure of FIG. 10 illustrates a state in which the power source Vdd is coupled to the touch detection electrode E2 with the switch SW1 set to ON, and the touch detection electrode E2 is not coupled to the capacitor Ccr with the switch SW2 set to OFF when the finger is in a contact state or a proximate state. In this state, a capacitance Cx2 caused by the finger that is proximate to the touch detection electrode E2 is charged in addition to the capacitance Cx1 included in the touch detection electrode E2. The right figure of FIG. 10 illustrates a state in which the power source Vdd is disconnected from the touch detection electrode E2 with the switch SW1 set to OFF, and the touch detection electrode E2 is coupled to the capacitor Ccr with the switch SW2 set to ON. In this state, the electric charge of the capacitance Cx1 and an electric charge of the capacitance Cx2 are discharged via the capacitor Ccr.

A voltage change characteristic of the capacitance Ccr during discharge (while the finger is in a contact state or a proximate state) illustrated in the right figure of FIG. 10 is obviously different from the voltage change characteristic of the capacitance Ccr during discharge (while the finger is in a non-contact state or a non-proximate state) illustrated in the right figure of FIG. 9 due to presence of the capacitance Cx2. Thus, in a self-capacitive system, whether there is an operation input performed by a finger and the like is determined by utilizing the fact that the voltage change characteristic of the capacitance Ccr varies depending on whether the capacitance Cx2 is present.

Specifically, AC rectangular wave Sg (refer to FIG. 12) having a predetermined frequency (for example, about several kHz to several hundred kHz) is applied to the touch detection electrode E2. The voltage detector DET illustrated in FIG. 11 converts variation in current corresponding to the AC rectangular wave Sg into variation in voltage (waveforms $V_4$ and $V_5$).

As described above, the touch detection electrode E2 is configured to be disconnected from other elements with the switch SW1 and the switch SW2. In FIG. 12, at a timing of time $T_{01}$, a voltage level of the AC rectangular wave Sg is increased to a voltage level corresponding to a voltage $V_0$. At this point, the switch SW1 is ON and the switch SW2 is OFF. Due to this, the voltage of the touch detection electrode E2 is increased to the voltage $V_0$. Next, the switch SW1 is turned OFF before a timing of time $T_{11}$. Although the touch detection electrode E2 is electrically floating at this point, the electric potential of the touch detection electrode E2 is kept at $V_0$ with the capacitance Cx1 (refer to FIG. 9) of the touch detection electrode E2 or a capacitance obtained by adding the capacitance Cx2 generated by contact or proximity of a finger and the like to the capacitance Cx1 of the touch detection electrode E2 (Cx1+Cx2, refer to FIG. 10). The switch SW3 is turned ON before the timing of time $T_{11}$, and turned OFF after a predetermined time has elapsed to reset the voltage detector DET. Through this reset operation, the output voltage becomes substantially the same voltage as Vref.

Subsequently, when the switch SW2 is turned ON at the timing of time $T_{11}$, an inverting input terminal of the voltage detector DET has the voltage $V_0$ of the touch detection electrode E2. Thereafter, the voltage of the inverting input terminal of the voltage detector DET is lowered to a reference voltage Vref in accordance with a time constant of the capacitance Cx1 (or Cx1+Cx2) of the touch detection electrode E2 and a capacitance C5 in the voltage detector DET. At this point, an electric charge accumulated in the capacitance Cx1 (or Cx1+Cx2) of the touch detection electrode E2 moves to the capacitance C5 in the voltage detector DET, so that the output of the voltage detector DET is increased (Vdet2). The output (Vdet2) of the voltage detector DET is represented as the waveform $V_4$ of a solid line when a finger and the like are not proximate to the touch detection electrode E2, and Vdet2=Cx1×$V_0$/C5 is satisfied. When capacitance caused by a finger and the like is added, the output (Vdet2) is represented as the waveform $V_5$ of a dotted line, and Vdet2=(Cx1+Cx2)×$V_0$/C5 is satisfied.

Thereafter, the switch SW2 is turned OFF and the switch SW1 and the switch SW3 are turned ON at a timing of time $T_{31}$ after the electric charge of the capacitance Cx1 (or Cx1+Cx2) of the touch detection electrode E2 sufficiently moves to the capacitance C5, and thus the electric potential of the touch detection electrode E2 is caused to be at a low level that is the same as the electric potential of the AC rectangular wave Sg, and the voltage detector DET is reset. In this case, a timing for turning ON the switch SW1 may be any timing after the switch SW2 is turned OFF and before time $T_{02}$. A timing for resetting the voltage detector DET may be any timing after the switch SW2 is turned OFF and before time $T_{12}$. The above operation is repeated at a predetermined frequency (for example, about several kHz to several hundred kHz). It can be measured whether there is an external proximity object (whether there is a touch input) based on an absolute value |ΔV| of a difference between the waveform $V_4$ and the waveform $V_5$. As illustrated in FIG. 12, the electric potential of the touch detection electrode E2 is represented as the waveform $V_2$ when a finger and the like are in a non-proximate state, and represented as the waveform $V_3$ when the capacitance Cx2 caused by a finger and the like is added. It can be measured whether there is an external proximity object (whether there is a touch input) by measuring a time until each of the waveform $V_2$ and the waveform $V_3$ is lowered to a predetermined voltage $V_{TH}$.

Figure 13:
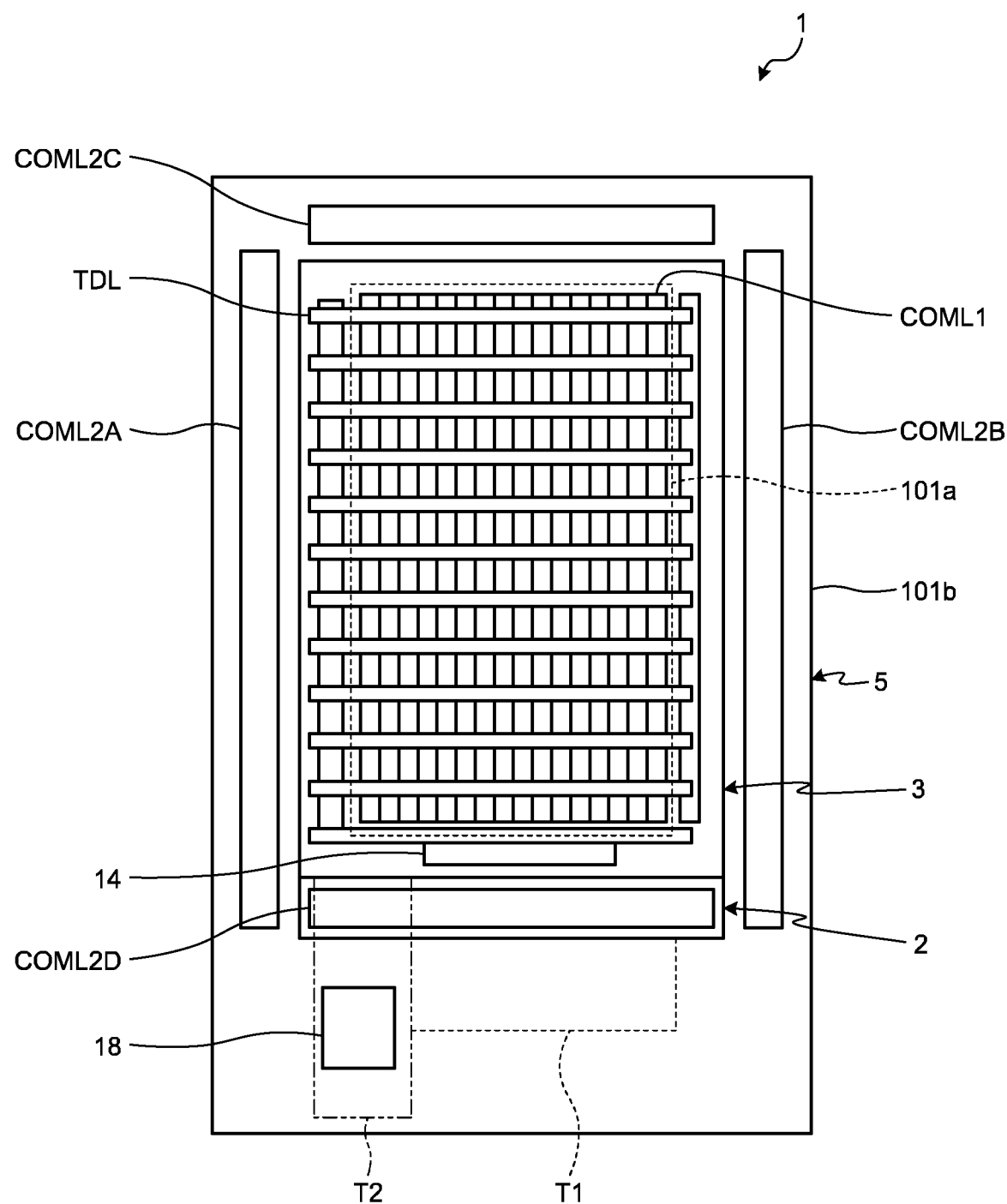
FIG. 13 is a plan view schematically illustrating the display device with a touch detection function.
Figure 14:
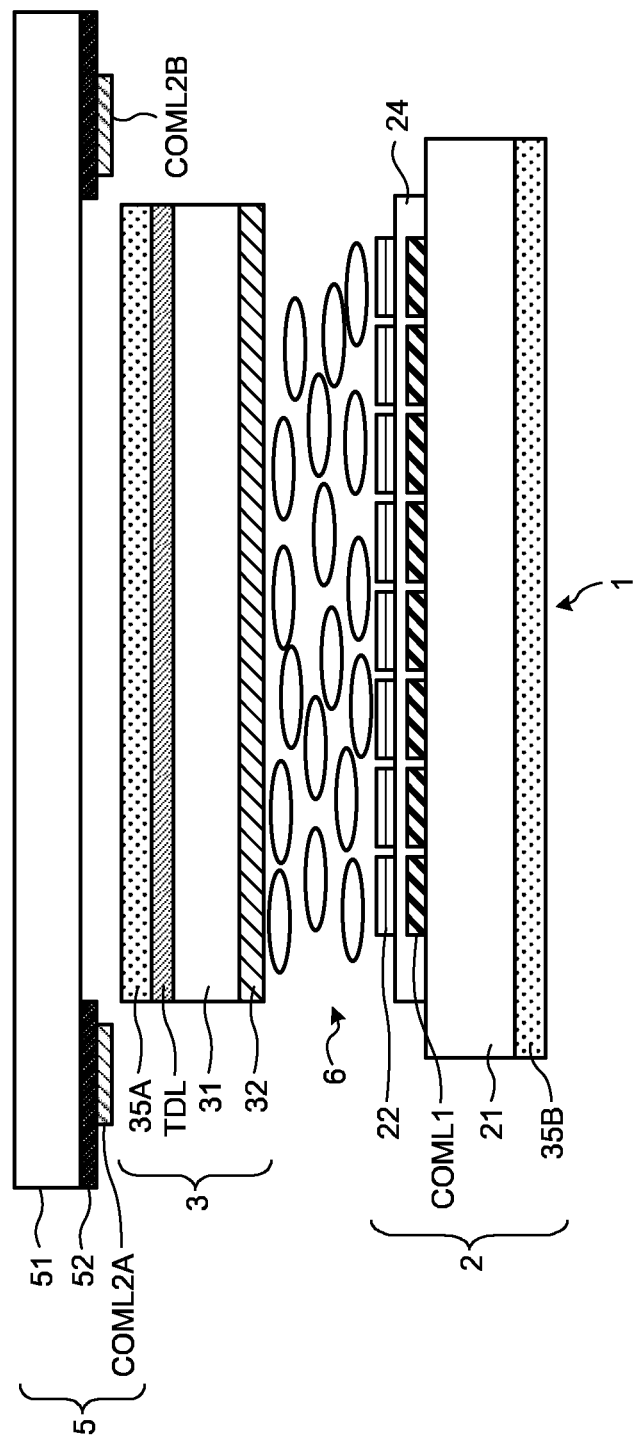
FIG. 14 is a cross-sectional view of a schematic structure of the display device with a touch detection function according to the first embodiment.
Figure 15:
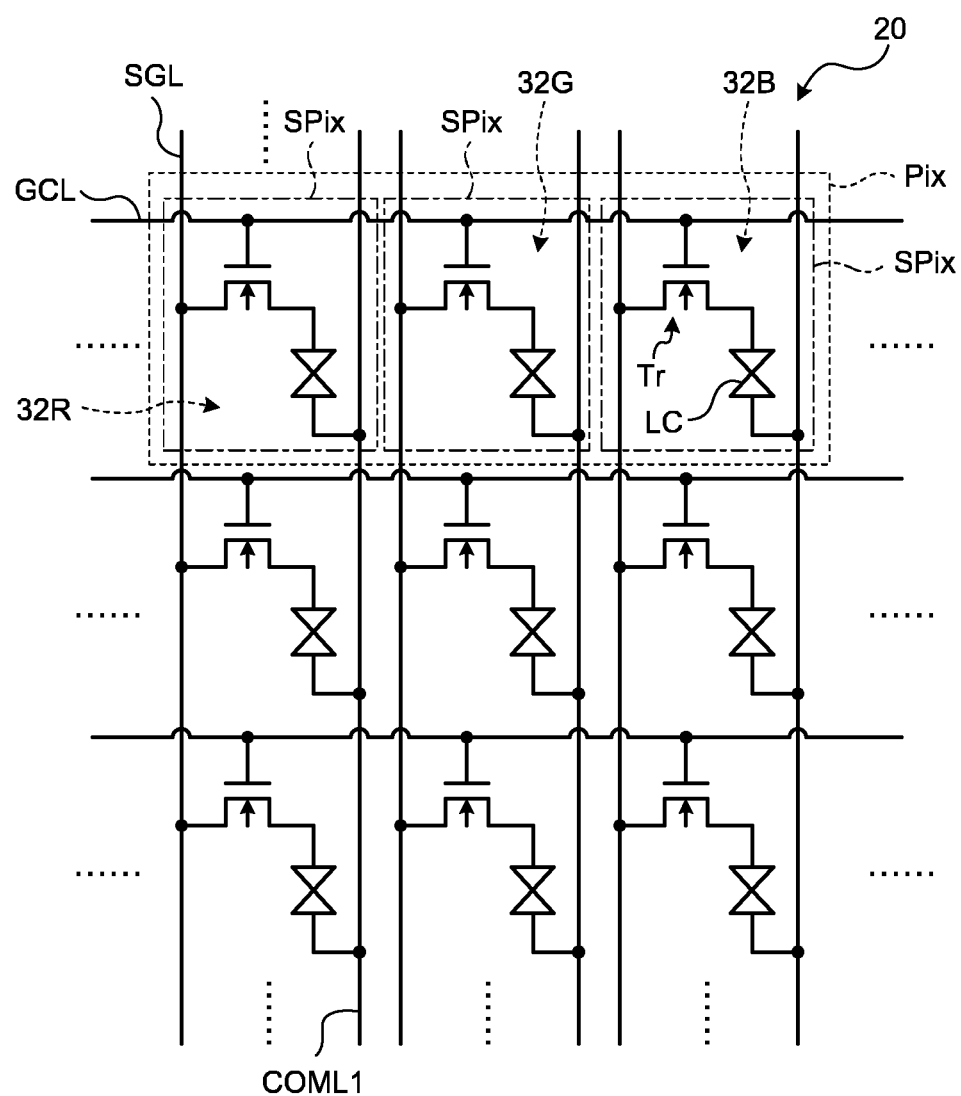
FIG. 15 is a circuit diagram illustrating a pixel array of a display unit with a touch detection function according to the first embodiment.

Next, the following describes a configuration example of the display device 1 with a touch detection function in detail. FIG. 13 is a plan view schematically illustrating the display device with a touch detection function. FIG. 14 is a cross-sectional view of a schematic structure of the display device with a touch detection function. FIG. 15 is a circuit diagram illustrating a pixel array of a display unit with a touch detection function according to the first embodiment.

As illustrated in FIG. 13, the display device 1 with a touch detection function includes a pixel substrate 2, a counter substrate 3, and a covering member 5. The pixel substrate 2, the counter substrate 3, and the covering member 5 are arranged so as to overlap each other in a plan view. The display device 1 with a touch detection function further includes the gate driver 12, the drive electrode driver 14, a display control IC (not illustrated in FIG. 13), and a touch detection IC 18. The pixel substrate 2 includes a display region 101a for displaying an image, and a frame region 101b outside the display region 101a. The display region 101a has a rectangular shape having a long side and a short side. The frame region 101b has a frame shape surrounding four sides of the display region 101a. In the present disclosure, the "frame region 101b" indicates a region inner than an outer circumference of the covering member 5 and outer than the display region 101a in a plan view.

In the display region 101a, a first drive electrode COML1 and a touch detection electrode TDL are arranged. In the frame region 101b, the second drive electrodes COML2A, COML2B, COML2C, and COML2D are arranged. A plurality of the first drive electrodes COML1 each extend in a direction along the long side of the display region 101a, and are arranged in a direction along the short side of the display region 101a. A plurality of the touch detection electrodes TDL each extend in the direction along the short side of the display region 101a, and are arranged in the direction along the long side of the display region 101a The second drive electrode COML2A, COML2B is arranged along at least one side of the outer circumference of the display region 101a. The second drive electrode COML2B is arranged along at least one side of the outer circumference of the display region 101a. The second drive electrode COML2C is arranged along at least one side of the outer circumference of the display region 101a. The second drive electrode COML2D is arranged along at least one side of the outer circumference of the display region 101a. Each of the second drive electrodes COML2A, COML2B, COML2C, and COML2D is preferably arranged to have a length substantially the same as or longer than the short side or the long side of the display region 101a. Each of the second drive electrodes COML2A, COML2B, COML2C, and COML2D may have a length shorter than the short side or the long side of the display region 101a. The second drive electrode COML2A is preferably continuous without being electrically separated into some pieces within a range along at least one side of the display region 101a. The second drive electrode COML2B is preferably continuous without being electrically separated into some pieces within a range along at least one side of the display region 101a. The second drive electrode COML2C is preferably continuous without being electrically separated into some pieces within a range along at least one side of the display region 101a. The second drive electrode COML2D is preferably continuous without being electrically separated into some pieces within a range along at least one side of the display region 101a. The first drive electrode COML1 and the second drive electrodes COML2A and COML2B extend in parallel with each other.

The second drive electrodes COML2A, COML2B, COML2C, and COML2D are arranged at ends of four sides of the frame region 101b, respectively. The second drive electrodes COML2A, COML2B, COML2C, and COML2D are preferably arranged to reach the vicinity of an end of the covering member 5. The second drive electrodes COML2A, COML2B, COML2C, and COML2D are preferably arranged to reach the same position as the end of the covering member 5. When, for example, the second drive electrodes COML2A, COML2B, COML2C, and COML2D are made of metal and a protective film is arranged to prevent corrosion, the second drive electrodes COML2A, COML2B, COML2C, and COML2D cannot be formed to reach the end of the covering member 5 in some cases. In such cases, each of the second drive electrodes COML2A, COML2B, COML2C, and COML2D is preferably formed within a range of 10 μm to 100 μm from the end of the covering member 5.

In this way, each of the second drive electrodes COML2A, COML2B, COML2C, and COML2D is arranged so as to be electrically continuous at a corresponding side of four sides of the frame region 101b and extends to have a length equal to or longer than the corresponding side of the display region 101a. Accordingly, by utilizing the capacitances of the second drive electrodes COML2A, COML2B, COML2C, and COML2D and the electrodes in the display region 101a, for example, a button function for determining whether there is an input to the frame region 101b can be implemented, and one-dimensional coordinates of an object along the side of the display region 101a can be acquired. Further, the one-dimensional coordinates can be combined with a detection result in the display region 101a to be used in various applications.

The width of the frame region 101b is very small as compared with that of the display region 101a, so that sensitivity in touch detection in the picture frame can be improved by arranging an electrode as large as possible on one side of the frame region 101b as such an arrangement.

In the present embodiment, the second drive electrodes COML2A, COML2B, COML2C, and COML2D are formed in the covering member 5 instead of the pixel substrate 2, so that an electrode area can be secured to reach the end of the covering member 5. The width of each of the second drive electrodes COML2A, COML2B, COML2C, and COML2D is preferably as large as possible. However, the width of each of the second drive electrodes COML2A, COML2B, COML2C, and COML2D is smaller than the length of the first drive electrode COML1.

As illustrated in FIG. 13, a flexible substrate T1 is coupled to the pixel substrate 2, and a flexible substrate T2 is coupled to the counter substrate 3. The touch detection IC 18 is mounted on the flexible substrate T2. The touch detection unit 40 illustrated in FIG. 1 is mounted on the touch detection IC 18, and a first touch detection signal Vdet1 that is output from the touch detection electrode TDL is supplied to the touch detection IC 18 via the flexible substrate T2.

As illustrated in FIG. 14, the display device 1 with a touch detection function includes the pixel substrate 2, the counter substrate 3 arranged being opposed to a direction perpendicular to a surface of the pixel substrate 2, a liquid crystal layer 6 interposed between the pixel substrate 2 and the counter substrate 3, and the covering member 5 arranged on a side of the counter substrate 3 opposite to the pixel substrate 2 side thereof.

The pixel substrate 2 includes a TFT substrate 21 serving as a circuit board, a plurality of pixel electrodes 22 arranged in a matrix on the upper side of the TFT substrate 21, the first drive electrodes COML1 arranged between the TFT substrate 21 and the pixel electrode 22, and an insulating layer 24 that insulates the pixel electrode 22 from the first drive electrodes COML1. A polarizing plate 35B may be arranged on the lower side of the TFT substrate 21 via a bonding layer.

The counter substrate 3 includes a glass substrate 31 and a color filter 32 formed on one surface of the glass substrate 31. The touch detection electrode TDL serving as a detection electrode of the touch panel 30 is arranged on the other surface of the glass substrate 31. A polarizing plate 35A is arranged on the upper side of the touch detection electrode TDL.

The covering member 5 includes a cover base material 51, a coloring layer 52, and the second drive electrodes COML2A, COML2B, COML2C, and COML2D (the second drive electrodes COML2C and COML2D are not illustrated in FIG. 14). The cover base material 51 is a protecting member for covering and protecting the pixel substrate 2 and the counter substrate 3. The cover base material 51 may be a glass substrate, or a film-like base material made of a resin material and the like. The coloring layer 52 is arranged on a surface of the cover base material 51 facing the counter substrate 3. The coloring layer 52 is arranged in the frame region 101b illustrated in FIG. 13. The coloring layer 52 can prevent a circuit and/or wiring of the source driver 13, the drive electrode driver 14, and the like, and the flexible substrates T1 and T2, and the like from being visually recognized from the outside. The coloring layer 52 is made of, for example, a resin material colored to prevent light transmission or a metallic material. The second drive electrodes COML2A and COML2B are arranged at positions overlapping the coloring layer 52. The second drive electrodes COML2C and COML2D (not illustrated in FIG. 14) are also arranged at positions overlapping the coloring layer 52.

The TFT substrate 21 and the glass substrate 31 are arranged facing each other with a predetermined gap therebetween via a spacer (not illustrated). The liquid crystal layer 6 is arranged in a space between the TFT substrate 21 and the glass substrate 31. The liquid crystal layer 6 modulates light passing therethrough depending on a state of an electric field. For example, the liquid crystal layer 6 includes liquid crystals of lateral electric-field mode such as in-plane switching (IPS) including fringe field switching (FFS). An orientation film may be arranged between the liquid crystal layer 6 and the pixel substrate 2, and between the liquid crystal layer 6 and the counter substrate 3 illustrated in FIG. 14.

The TFT substrate 21 is provided with a thin film transistor element (hereinafter, referred to as a TFT element) Tr of each sub-pixel SPix illustrated in FIG. 15, and wiring such as a pixel signal line SGL that supplies the pixel signal Vpix to each pixel electrode 22 and a scanning signal line GCL that supplies the drive signal for driving each TFT element Tr. The pixel signal line SGL and the scanning signal line GCL extend along a plane parallel with the surface of the TFT substrate 21.

The display panel 20 illustrated in FIG. 15 includes a plurality of sub-pixels SPix arranged in a matrix. Each sub-pixel SPix includes the TFT element Tr and a liquid crystal element LC. The TFT element Tr is constituted of a thin film transistor. In this example, the TFT element Tr is constituted of an n-channel metal oxide semiconductor (MOS) TFT. A source of the TFT element Tr is coupled to the pixel signal line SGL, a gate thereof is coupled to the scanning signal line GCL, and the drain thereof is coupled to one end of the liquid crystal element LC. One end of the liquid crystal element LC is coupled to the drain of the TFT element Tr, and the other end thereof is coupled to the first drive electrode COML1.

The sub-pixel SPix is coupled to the other sub-pixels SPix belonging to the same row in the display panel 20 via the scanning signal line GCL. The scanning signal line GCL is coupled to the gate driver 12 (refer to FIG. 1), and receives the scanning signal Vscan supplied from the gate driver 12. The sub-pixel SPix is coupled to the other sub-pixels SPix belonging to the same column in the display panel 20 via the pixel signal line SGL. The pixel signal line SGL is coupled to the source driver 13 (refer to FIG. 1), and receives the pixel signal Vpix supplied from the source driver 13. The sub-pixel SPix is further coupled to the other sub-pixels SPix belonging to the same column via the first drive electrode COML1. The first drive electrode COML1 is coupled to the drive electrode driver 14 (refer to FIG. 1), and receives the first drive signal Vcom supplied from the drive electrode driver 14. That is, in this example, a plurality of sub-pixels SPix belonging to the same column share one first drive electrode COML1. The first drive electrode COML1 according to the present embodiment extends in parallel with an extending direction of the pixel signal line SGL, and extends in a direction intersecting with an extending direction of the scanning signal line GCL. The extending direction of the first drive electrode COML1 is not limited thereto. For example, the first drive electrode COML1 may extend in a direction parallel with the scanning signal line GCL.

The gate driver 12 illustrated in FIG. 1 drives the scanning signal lines GCL to sequentially scan each of the scanning signal lines GCL. The gate driver 12 applies the scanning signal Vscan (refer to FIG. 1) to a gate of the TFT element Tr of the sub-pixel SPix via the scanning signal line GCL to sequentially select one line (one horizontal line) of the sub-pixels SPix as the display driving target. In the display device 1 with a touch detection function, the source driver 13 supplies the pixel signals Vpix to the sub-pixels SPix belonging to the selected one horizontal line via the pixel signal line SGL illustrated in FIG. 15. The sub-pixels SPix perform display for each horizontal line based on the pixel signals Vpix supplied to the sub-pixels SPix. During this display operation, the drive electrode driver 14 applies the first drive signal Vcom to the first drive electrode COML1. A common potential is supplied to the pixel electrode 22 by the first drive signal Vcom in the display operation.

In the color filter 32 illustrated in FIG. 14, for example, color regions of the color filter colored in three colors of red (R), green (G), and blue (B) may be periodically arranged. Color regions 32R, 32G, and 32B of three colors R, G, and B correspond to the sub-pixels SPix illustrated in FIG. 15, and a pixel Pix is constituted of a set of sub-pixels SPix corresponding to the color regions of three colors. As illustrated in FIG. 14, the color filter 32 faces the liquid crystal layer 6 in a direction perpendicular to the TFT substrate 21. Another combination of colors may be used for the color filter 32 so long as the colors are different from each other. The combination of colors for the color filter 32 is not limited to three colors. Alternatively, four or more colors may be combined.

Figure 16:
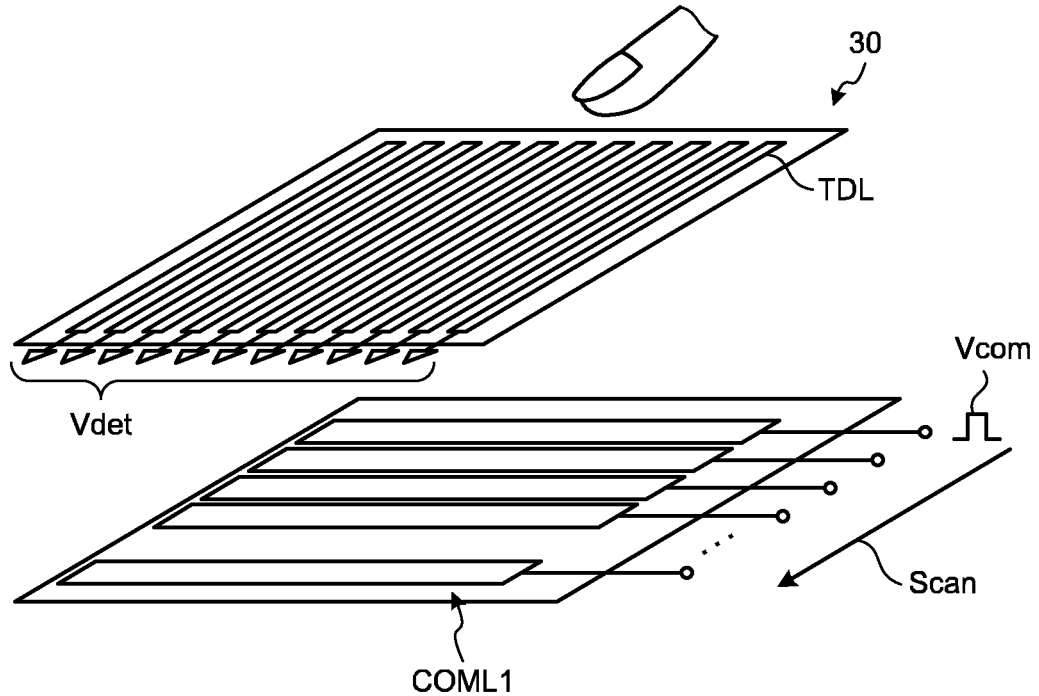
FIG. 16 is a perspective view of a configuration example of a drive electrode and a touch detection electrode of the display unit with a touch detection function according to the first embodiment.

The first drive electrode COML1 illustrated in FIG. 14 and FIG. 15 functions as a common electrode that gives a common potential to the pixel electrodes 22 of the display panel 20, and also functions as a drive electrode in performing mutual-capacitive touch detection of the touch panel 30. The first drive electrode COML1 may also function as a detection electrode for performing self-capacitive touch detection of the touch panel 30. FIG. 16 is a perspective view of a configuration example of the drive electrode and the touch detection electrode of the display unit with a touch detection function according to the first embodiment. The touch panel 30 includes the first drive electrode COML1 arranged in the pixel substrate 2 and the touch detection electrode TDL arranged in the counter substrate 3.

The first drive electrodes COML1 have a plurality of striped electrode patterns extending in a horizontal direction of FIG. 16. The touch detection electrodes TDL have a plurality of electrode patterns extending in a direction intersecting with the extending direction of the electrode patterns of the first drive electrodes COML1. The touch detection electrodes TDL face the first drive electrodes COML1 in a direction perpendicular to the surface of the TFT substrate 21 (refer to FIG. 14). Each electrode pattern of the touch detection electrode TDL is coupled to an input terminal of the touch detection signal amplification unit 42 in the touch detection unit 40 (refer to FIG. 1). Capacitance is formed at each intersecting portion between each electrode pattern of the first drive electrode COML1 and each electrode pattern of the touch detection electrode TDL.

A translucent conductive material such as indium tin oxide (ITO) is used for the touch detection electrode TDL and the first drive electrode COML1, for example. The shape of the touch detection electrode TDL and the first drive electrode COML1 (drive electrode block) is not limited to a plurality of stripes. For example, the touch detection electrode TDL and the first drive electrode COML1 may have a comb-teeth shape. Alternatively, it is sufficient that the touch detection electrodes TDL and the first drive electrodes COML1 have a pattern divided into a plurality of parts, and the shape of slits that separate the first drive electrodes COML1 may be a straight line or a curved line.

With this configuration, when the touch panel 30 performs a mutual-capacitive touch detection operation, the drive electrode driver 14 sequentially scan the first drive electrodes COML1 in a time division manner as a drive electrode block, so that one detection block of the first drive electrode COML1 is sequentially selected. When the first touch detection signal Vdet1 is output from the touch detection electrode TDL, touch detection for one detection block is performed. That is, the drive electrode block corresponds to the drive electrode E1 in the basic principle of mutual-capacitive touch detection described above, the touch detection electrode TDL corresponds to the touch detection electrode E2, and the touch panel 30 detects a touch input in accordance with the basic principle. As illustrated in FIG. 16, in the touch panel 30, the touch detection electrode TDL and the first drive electrode COML1 intersecting with each other constitute a capacitance touch sensor in a matrix. Thus, by scanning across the entire touch detection surface of the touch panel 30, a position where an external conductor is brought into contact with or proximate to the touch panel 30 can be detected.

In the embodiment, one drive electrode block includes one or more drive electrodes COML. The number of drive electrodes COML included in the one drive electrode block can be predetermined. In the embodiment, the detection block corresponds to the drive electrode block.

Figure 17:
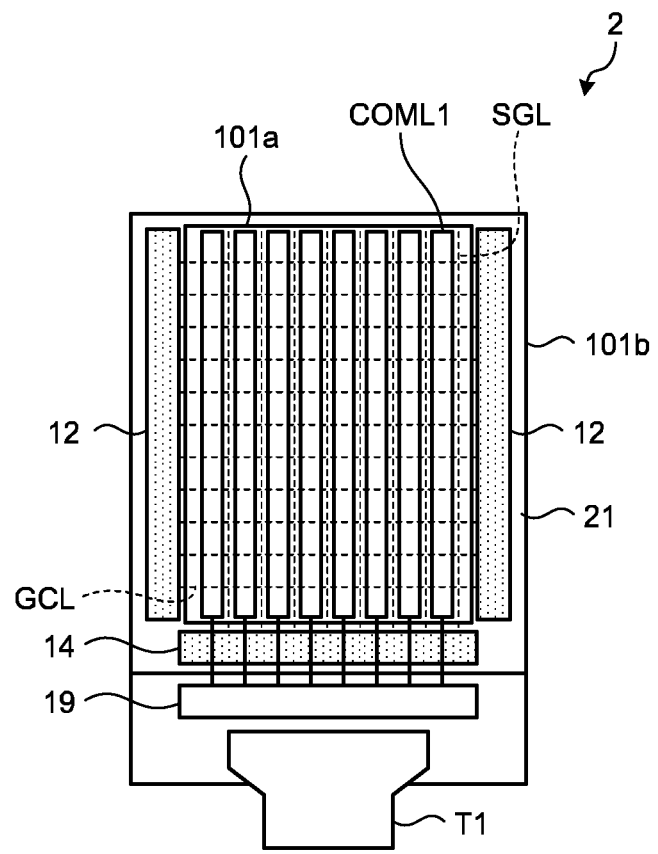
FIG. 17 is a plan view schematically illustrating a pixel substrate according to the first embodiment.
Figure 18:
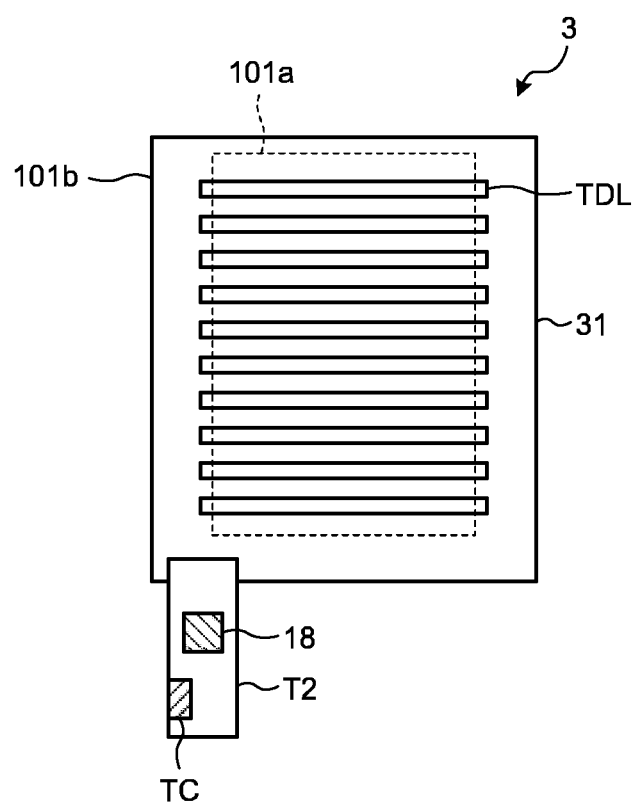
FIG. 18 is a plan view schematically illustrating a counter substrate according to the first embodiment.
Figure 19:
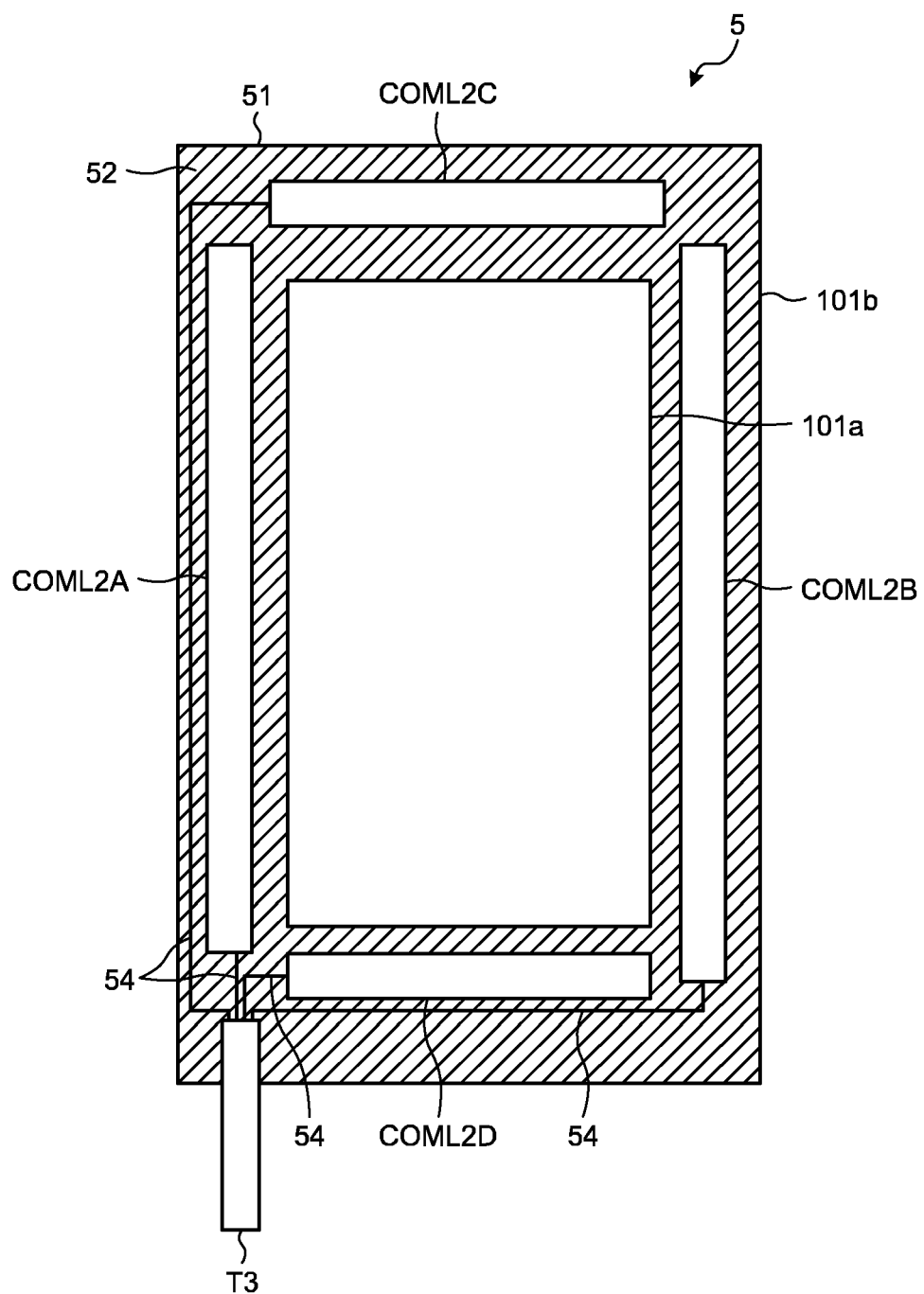
FIG. 19 is a plan view schematically illustrating a covering member according to the first embodiment.

Next, the following describes a configuration of the first drive electrode COML1, the second drive electrodes COML2A, COML2B, COML2C, and COML2D, and the touch detection electrode TDL with reference to FIGS. 17 to 19. FIG. 17 is a plan view schematically illustrating the pixel substrate according to the first embodiment. FIG. 18 is a plan view schematically illustrating the counter substrate according to the first embodiment. FIG. 19 is a plan view schematically illustrating the covering member according to the first embodiment.

As illustrated in FIG. 17, the first drive electrode COML1 is arranged in the display region 101a of the TFT substrate 21. The drive electrode driver 14 and a display control IC 19 are arranged along the short side of the frame region 101b of the TFT substrate 21, and the source driver 13 is arranged along the long side of the frame region 101b. The display control IC 19 is a chip mounted on the TFT substrate 21 using a chip on glass (COG) system, and incorporates the control unit 11 described above. The display control IC 19 outputs a control signal to a scanning signal line GCL, a pixel signal line SGL, and the like based on the video signal Vdisp (refer to FIG. 1) supplied from an external host IC (not illustrated). The flexible substrate T1 is coupled to the short side of the frame region 101b.

In the present embodiment, the first drive electrode COML1 extends in a direction intersecting with an extending direction of the scanning signal line GCL. Thus, wiring from the first drive electrode COML1 can be drawn out toward the short side (flexible substrate T1 side) of the frame region 101b. Accordingly, as compared with a case in which the first drive electrode COML1 extends in a direction orthogonal to the pixel signal line SGL, the drive electrode driver 14 is not necessarily arranged on the long side of the frame region 101b, and the width of the frame region 101b can be reduced.

The drive electrode driver 14 and the flexible substrate T1 are arranged in the vicinity of an end of the first drive electrode COML1 in the extending direction of the first drive electrode COML1. Accordingly, the length of the wiring drawn out from the first drive electrode COML1 can be shortened, and the area of the frame region 101b can be reduced.

As illustrated in FIG. 18, the touch detection electrode TDL is arranged in a region of the glass substrate 31, the region overlapping the display region 101a. The flexible substrate T2 is coupled to the short side of the frame region 101b of the glass substrate 31. The wiring (not illustrated in FIG. 16) drawn out from the end of the touch detection electrode TDL is arranged in the frame region 101b, and the touch detection electrode TDL is coupled to the touch detection IC 18 via the wiring and the flexible substrate T2. The flexible substrate T2 includes a connector TC. The flexible substrate T2 is coupled to a flexible substrate T3 (described later) of the covering member 5 via the connector TC.

As illustrated in FIG. 19, the second drive electrodes COML2A, COML2B, COML2C, and COML2D are arranged in the frame region 101b of the cover base material 51. The coloring layer 52 is arranged on the entire surface of the frame region 101b of the cover base material 51, and the second drive electrodes COML2A, COML2B, COML2C, and COML2D overlap the coloring layer 52. FIG. 19 illustrates a plan view of the covering member 5 viewed from an upper surface side, and schematically illustrates the second drive electrodes COML2A, COML2B, COML2C, and COML2D, and the like. In the present disclosure, the "frame region 101b" is a region inside the outer circumference of the cover base material 51 and outside the display region 101a in a plan view as illustrated in FIG. 17 as a hatched area.

The second drive electrodes COML2A, COML2B, COML2C, and COML2D are arranged to surround four sides of the display region 101a. The second drive electrodes COML2A and COML2B each continuously extend in a direction along the long side of the display region 101a, and are arranged with the display region 101a interposed therebetween. The second drive electrodes COML2C and COML2D each continuously extend in a direction along the short side of the display region 101a, and are arranged with the display region 101a interposed therebetween.

The second drive electrodes COML2A, COML2B, COML2C, and COML2D are separated from each other, and are each coupled to the flexible substrate T3 via wiring 54. The flexible substrate T3 is coupled to the flexible substrate T2 of the counter substrate 3 described above via the connector TC. Accordingly, the touch detection IC 18 is coupled to the second drive electrodes COML2A, COML2B, COML2C, and COML2D. The driving driver 48 (refer to FIG. 1) mounted on the touch detection IC 18 can supply a driving signal for touch detection to the second drive electrodes COML2A, COML2B, COML2C, and COML2D.

The second drive electrodes COML2A, COML2B, COML2C, and COML2D and the wiring 54 can be formed by a printing method using conductive paste including a metallic material such as silver (Ag) and copper (Cu). In the same manner as the first drive electrode COML1, ITO may be used. The second drive electrodes COML2A, COML2B, COML2C, and COML2D and the wiring 54 are arranged in a region overlapping the coloring layer 52, so that the second drive electrodes COML2A, COML2B, COML2C, and COML2D and the wiring 54 are prevented from being visually recognized from the outside even in a case of using a metallic material having high conductivity.

Figure 20:
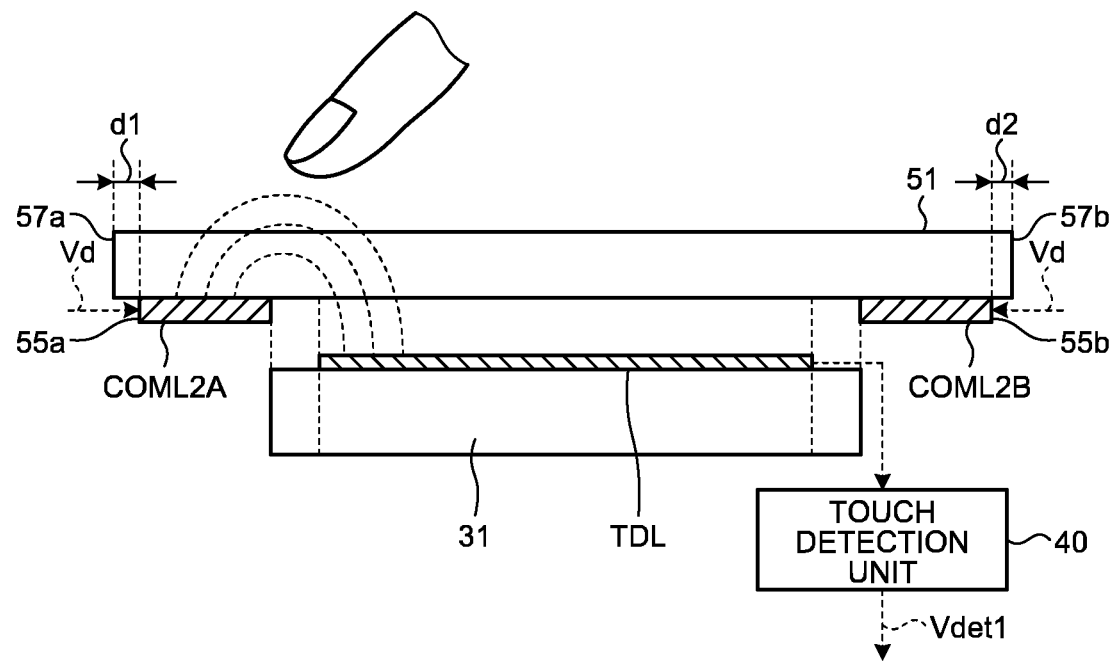
FIG. 20 is a schematic cross-sectional view schematically illustrating a relation between a second drive electrode and the touch detection electrode.
Figure 21:
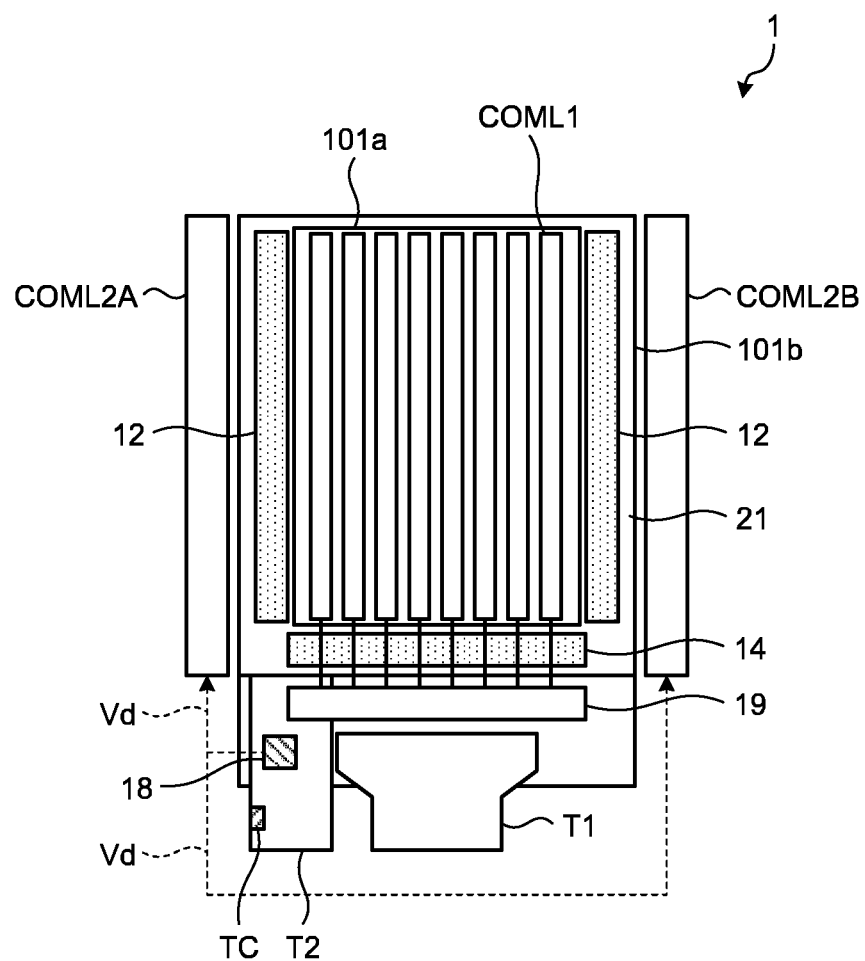
FIG. 21 is a schematic plan view for explaining a method for driving a first drive electrode and the second drive electrode.
Figure 22:
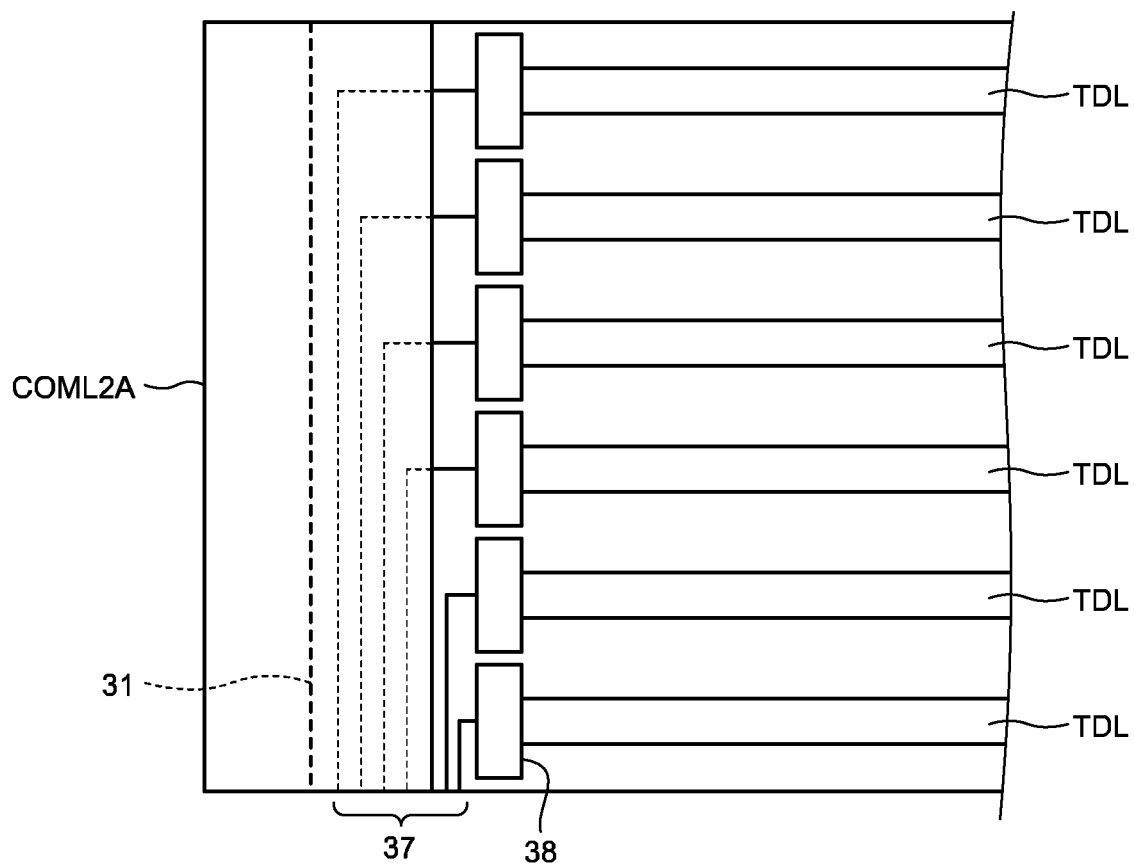
FIG. 22 is a schematic plan view for schematically illustrating the relation between the second drive electrode and the touch detection electrode in an enlarged manner.

FIG. 20 is a schematic cross-sectional view schematically illustrating a relation between the second drive electrode and the touch detection electrode. FIG. 21 is a schematic plan view for explaining a method for driving the first drive electrode and the second drive electrode. FIG. 22 is a schematic plan view for schematically illustrating the relation between the second drive electrode and the touch detection electrode in an enlarged manner. As illustrated in FIG. 20, the second drive electrodes COML2A and COML2B are arranged outside the end of the touch detection electrode TDL in the extending direction of the touch detection electrode TDL, and in a layer different from that of the touch detection electrode TDL. Also in this case, capacitance is formed between the touch detection electrode TDL and the second drive electrodes COML2A and COML2B. When a finger is brought into contact with or proximate to the frame region 101b or the vicinity of a boundary between the display region 101a and the frame region 101b, capacitance caused by the finger is in the vicinity of the touch detection electrode TDL, so that capacitance corresponding to fringes between the touch detection electrode TDL and the second drive electrodes COML2A and COML2B is shielded. Thus, contact or proximity of the finger to the frame region 101b can be detected based on the basic principle of mutual-capacitive touch detection described above. That is, the electric line of force extends toward the touch detection electrode TDL arranged in the display region 101a, the electric line of force being generated from the second drive electrodes COML2A and COML2B arranged in the frame region 101b. When a conductive material such as a finger is brought into contact with or proximate to the frame region 101b, the electric line of force is shielded, and an output potential of the touch detection electrode TDL arranged in the display region 101a is lowered.

As illustrated in FIG. 21, the second drive electrodes COML2A and COML2B receive the second drive signal Vd supplied from the driving driver 48 (refer to FIG. 1) mounted on the touch detection IC 18. The first drive electrode COML1 receives the first drive signal Vcom supplied from the drive electrode driver 14. Touch detection in the frame region 101b is performed based on a change in capacitance between the second drive electrodes COML2A and COML2B in the frame region 101b and the touch detection electrode TDL in the display region 101a, and touch detection in the display region 101a is performed based on a change in capacitance between the touch detection electrode TDL in the display region 101a and the first drive electrode COML1. Thus, when the second drive electrodes COML2A and COML2B and the first drive electrode COML1 are sequentially driven, sensitivity in touch detection can be prevented from being lowered in the vicinity of the outer circumference of the display region 101a.

The second drive electrodes COML2A and COML2B are preferably arranged outside an outer edge of the glass substrate 31. This configuration can reduce parasitic capacitance formed between wiring and the like and the second drive electrodes COML2A and COML2B arranged in the frame region 101b of the glass substrate 31 to improve touch detection accuracy.

As illustrated in FIG. 20, an end 55a of the second drive electrode COML2A and an end 55b of the second drive electrode COML2B are preferably arranged in the vicinity of ends 57a and 57b of the cover base material 51, respectively. More preferably, the end 55a of the second drive electrode COML2A and the end 55b of the second drive electrode COML2B are arranged at positions overlapping the ends 57a and 57b of the cover base material 51, respectively. When, for example, the second drive electrodes COML2A and COML2B are made of metal and a protective film is arranged to prevent corrosion, the second drive electrodes COML2A and COML2B cannot be formed to reach the end of the cover base material 51 in some cases. In such cases, a distance d1 between the end 55a of the second drive electrode COML2A and the end 57a of the cover base material 51 and a distance d2 between the end 55b of the second drive electrode COML2B and the end 57b of the cover base material 51 are preferably within a range from 10 µm to 100 µm.

As illustrated in FIG. 22, a pad part 38 is arranged at the end of the touch detection electrode TDL, and wiring 37 is drawn out from the pad part 38. The wiring 37 is routed in the frame region 101b to be coupled to the flexible substrate T2 (refer to FIG. 18). The second drive electrode COML2A is arranged outside the end of the touch detection electrode TDL, and may overlap part of the wiring 37. That is, the second drive electrode COML2A is preferably arranged at a position not overlapping the touch detection electrode TDL. Similarly, the second drive electrode COML2B (not illustrated in FIG. 22) may also overlap part of the wiring 37. In this case, the width of the frame region 101b of the cover base material 51 can be reduced.

Figure 23:
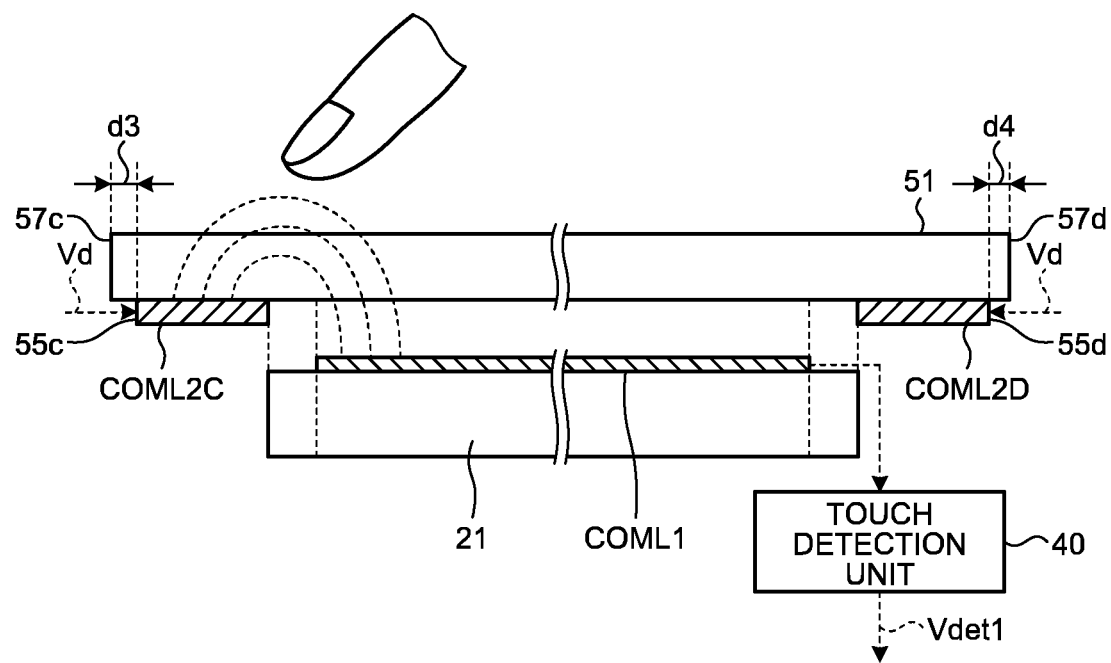
FIG. 23 is a schematic cross-sectional view schematically illustrating a relation between the first drive electrode and the second drive electrode.
Figure 24:
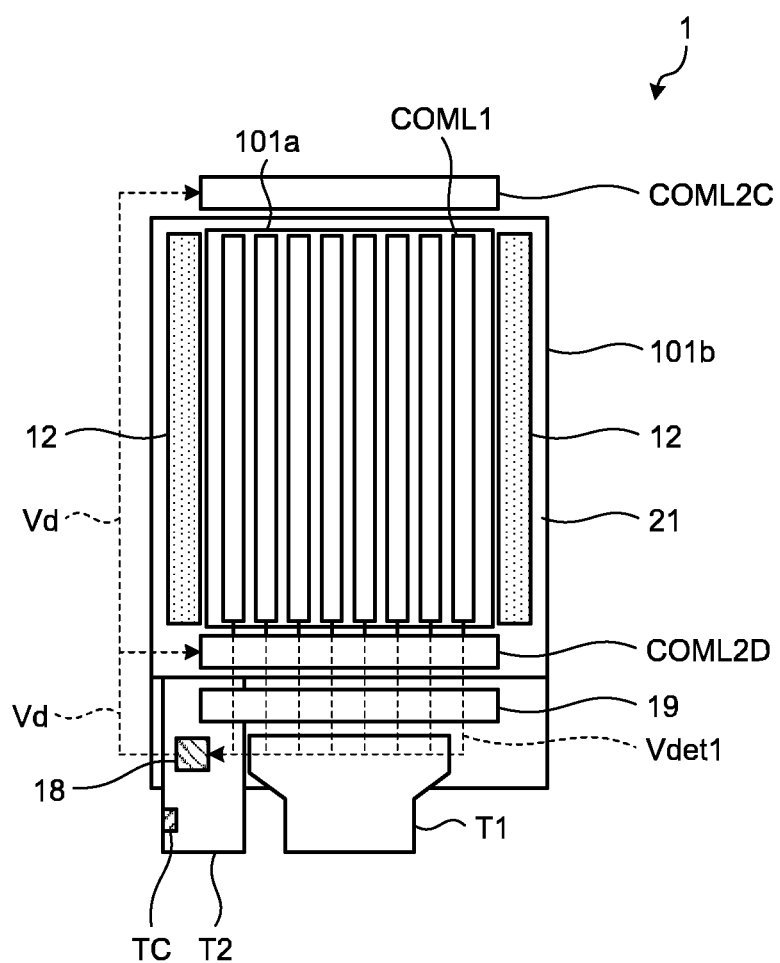
FIG. 24 is a schematic cross-sectional view schematically illustrating the relation between the first drive electrode and the second drive electrode.

FIG. 23 is a schematic cross-sectional view schematically illustrating a relation between the first drive electrode and the second drive electrode. FIG. 24 is a schematic cross-sectional view schematically illustrating the relation between the first drive electrode and the second drive electrode. As illustrated in FIG. 23, the second drive electrodes COML2C and COML2D are arranged outside the end of the first drive electrode COML1 in the extending direction of the first drive electrode COML1, and in a layer different from that of the first drive electrode COML1. Capacitance is formed between the first drive electrode COML1 and the second drive electrodes COML2C and COML2D. In the present embodiment, touch detection in the frame region 101b can be performed based on a change in capacitance between the first drive electrode COML1 and the second drive electrodes COML2C and COML2D. In this case, the second drive electrodes COML2C and COML2D correspond to the drive electrode E1 in the basic principle of mutual-capacitive touch detection described above, and the first drive electrode COML1 corresponds to the touch detection electrode E2. As illustrated in FIGS. 22 and 23, the second drive signal Vd is supplied to the second drive electrodes COML2C and COML2D. The touch detection unit 40 is coupled to the first drive electrode COML1, and the first touch detection signal Vdet1 is output from the first drive electrode COML1 via the touch detection unit 40.

As illustrated in FIG. 23, an end 55c of the second drive electrode COML2C and an end 55d of the second drive electrode COML2D are preferably arranged in the vicinity of ends 57c and 57d of the cover base material 51, respectively. More preferably, the end 55c of the second drive electrode COML2C and the end 55d of the second drive electrode COML2D are arranged at positions overlapping the ends 57c and 57d of the cover base material 51, respectively. When, for example, the second drive electrodes COML2C and COML2D are made of metal and a protective film is arranged to prevent corrosion, the second drive electrodes COML2C and COML2D cannot be formed to reach the end of the cover base material 51 in some cases. In such cases, a distance d3 between the end 55c of the second drive electrode COML2C and the end 57c of the cover base material 51 and a distance d4 between the end 55d of the second drive electrode COML2D and the end 57d of the cover base material 51 are preferably within a range from 10 µm to 100 µm.

In the display device 1 with a touch detection function according to the present embodiment, the second drive electrodes COML2A, COML2B, COML2C, and COML2D are arranged in the frame region 101b of the cover base material 51, so that a picture frame electrode having a large electrode area can be continuously arranged in the frame region 101b irrespective of arrangement of wiring and the like of the display device and/or the touch detection device. In liquid crystal display devices including an In-Cell or On-Cell touch panel, the wiring and the flexible substrate are arranged in the frame region 101b of the glass substrate, so that an electrode for picture frame detection can be hardly arranged therein. Additionally, the picture frame is required to be narrowed in recent years, so that it is insufficient in performance that only a picture frame is arranged in the liquid crystal display device. When the electrode is arranged in the covering member 5, the electrode can be arranged close to the outermost circumference of a set structure of an electronic apparatus including the touch detection device, so that one-dimensional coordinates at which the finger is proximate to or brought into contact with the frame region 101b can be detected, for example. Due to this, for example, a slide operation, gesture, and the like in the frame region 101b can be linked with a display operation in the display region 101a and an application.

The second drive electrodes COML2A, COML2B, COML2C, and COML2D are arranged, so that sensitivity in touch detection can be improved in the vicinity of the boundary between the display region 101a and the frame region 101b. Accordingly, uniformity of sensitivity in touch detection on the entire touch detection surface can be improved. The second drive electrodes COML2A, COML2B, COML2C, and COML2D are arranged in a layer different from that of the first drive electrode COML1, so that the width of the frame region 101b of the TFT substrate 21 can be reduced as compared with a case in which the first drive electrode COML1 is arranged in the frame region 101b of the TFT substrate 21. Thus, the display device 1 with a touch detection function according to the present embodiment can exhibit an excellent picture frame detection performance while preventing the frame region from being increased.

Figure 25:
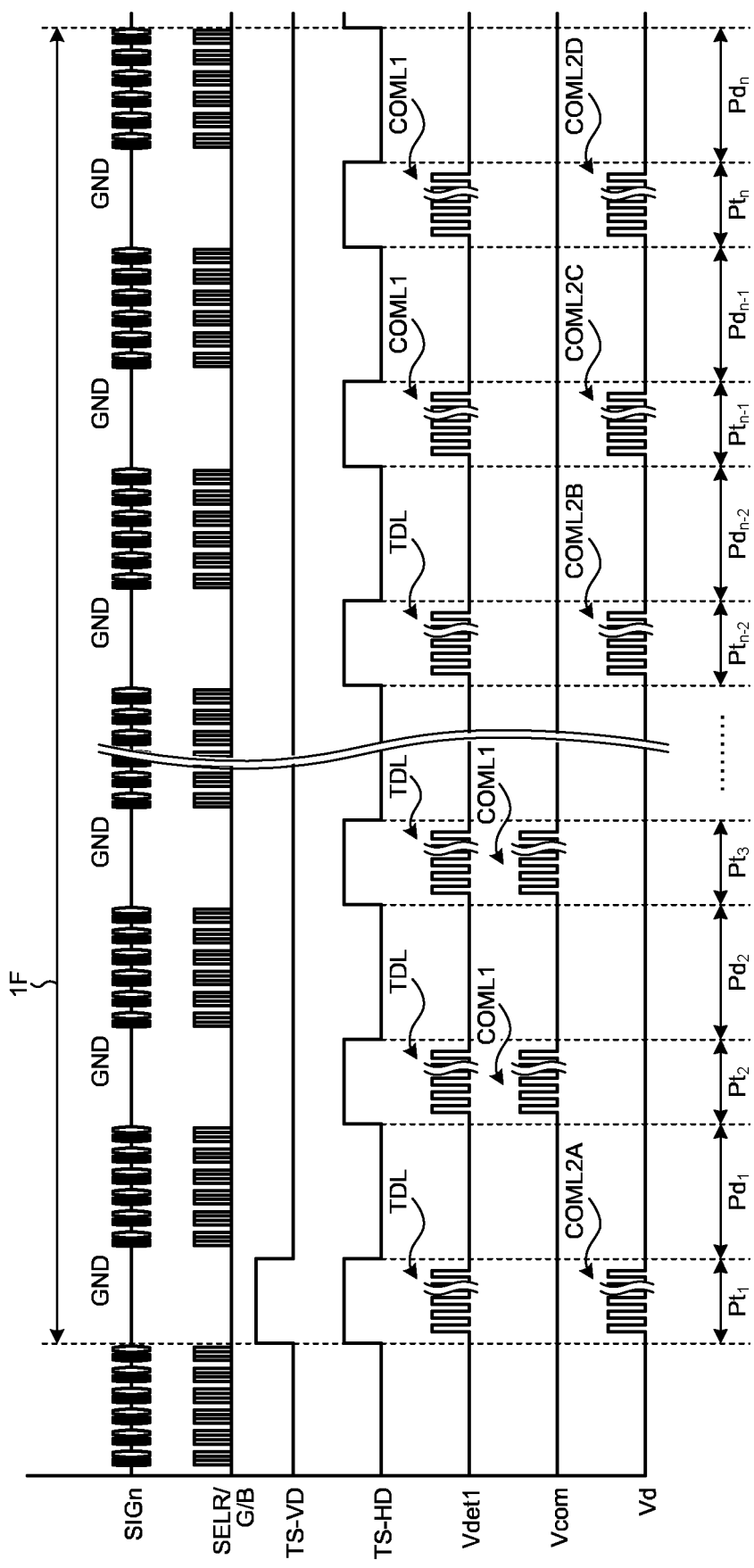
FIG. 25 is a timing waveform chart illustrating an operation example of the display device with a touch detection function according to the first embodiment.

Next, the following describes a method for driving the display device 1 with a touch detection function according to the present embodiment with reference to FIG. 25. FIG. 25 is a timing waveform chart illustrating an operation example of the display device with a touch detection function according to the first embodiment.

Examples of an operating method of the display device 1 with a touch detection function include a method in which the display device 1 with a touch detection function performs a touch detection operation (touch detection period) and a display operation (display operation period) in a time division manner. The touch detection operation and the display operation may be separately performed in any manner. The following describes a method of performing the touch detection operation and the display operation while dividing each operation into a plurality of parts within one frame period (1F) of the display panel 20, that is, within time required for displaying video information corresponding to one screen.

As illustrated in FIG. 25, when a control signal (TS-VD) is turned ON, one frame period (1F) is started. The control signal (TS-HD) is turned ON and OFF repeatedly in one frame period (1F). The touch detection operation is performed in a period in which the control signal (TS-HD) is ON, and the display operation is performed in a period in which the control signal (TS-HD) is OFF. The control signal (TS-VD) and the control signal (TS-HD) are output based on a clock signal from a clock generation unit of the control unit 11 (refer to FIG. 1). One frame period (1F) includes a plurality of display operation periods $Pd_x$ (x=1, 2, ... n) and a plurality of touch detection periods $Pt_x$ (x=1, 2, ... n) in which the touch detection operation is performed. These periods are alternately arranged on a time axis as follows: the touch detection period $Pt_1$, the display operation period $Pd_1$, the touch detection period $Pt_2$, the display operation period $Pd_2$, ....

The control unit 11 supplies pixel signals Vpix to pixels Pix of a plurality of rows (refer to FIG. 15) selected in the respective display operation periods $Pd_x$ by controlling the gate driver 12 and the source driver 13. FIG. 25 illustrates a selection signal (SELR/G/B) for selecting three colors of RGB and a video signal (SIGn) for each color. When each corresponding sub-pixel SPix is selected in accordance with the selection signal (SELR/G/B), and the video signal (SIGn) for each color is supplied to the selected sub-pixel SPix, an image display operation is performed. An image obtained by dividing the video signal Vdisp corresponding to one screen into n parts is displayed in each display operation period $Pd_x$, and video information corresponding to one screen is displayed in the display operation periods $Pd_1, Pd_2, \ldots Pd_n$.

In the first touch detection period $Pt_1$ among the touch detection periods $Pt_x$ (x=1, 2, ... n), the control unit 11 outputs a control signal to the driving driver 48. The driving driver 48 supplies the second drive signal Vd for touch detection to the second drive electrode COML2A. The touch detection unit 40 detects whether there is a touch input to the frame region 101b and performs an arithmetic operation of coordinates of an input position based on the first touch detection signal Vdet1 supplied from the touch detection electrode TDL.

Next, in the touch detection periods $Pt_2, Pt_3 \ldots$, the control unit 11 outputs the control signal to the drive electrode driver 14. The drive electrode driver 14 supplies the first drive signal Vcom for touch detection to the first drive electrode COML1. The touch detection unit 40 detects whether there is a touch input to the display region 101a and performs an arithmetic operation of coordinates of an input position based on the first touch detection signal Vdet1 supplied from the touch detection electrode TDL.

Thereafter, in the touch detection period $Pt_{n-2}$, the second drive signal Vd is supplied from the driving driver 48 to the second drive electrode COML2B, and the first touch detection signal Vdet1 is output from the touch detection electrode TDL. In the touch detection period $Pt_{n-1}$, the second drive signal Vd is supplied to the second drive electrode COML2C, and the first touch detection signal Vdet1 is output from the first drive electrode COML1. In the last touch detection period $Pt_n$ in one frame period (1F), the second drive signal Vd for touch detection is supplied to the second drive electrode COML2D, and the first touch detection signal Vdet1 is output from the first drive electrode COML1. The touch detection unit 40 detects whether there is a touch input to the frame region 101b and performs an arithmetic operation of coordinates of an input position based on the first touch detection signal Vdet1 supplied from the touch detection electrode TDL and the first drive electrode COML1.

As described above, in the touch detection period $Pt_x$ (x=1, 2, ... n) in one frame period (1F), the control unit 11 outputs the control signals to the drive electrode driver 14 and the driving driver 48 to perform touch detection drive scanning so that the drive signal is sequentially supplied to the second drive electrodes COML2A, COML2B, COML2C, and COML2D and each detection block of the first drive electrode COML1. In each touch detection period $Pt_x$, the first touch detection signal Vdet1 is output from the touch detection electrode TDL or the first drive electrode COML1. Through such a touch detection operation, a touch input to the frame region 101b can be detected while preventing the area of the frame region 101b of the TFT substrate 21 illustrated in FIG. 17 and the area of the frame region 101b of the glass substrate 31 illustrated in FIG. 18 from being increased, and expanding a region in which touch detection can be performed to the frame region 101b outside the display region 101a. The display device 1 with a touch detection function according to the present embodiment can improve sensitivity in touch detection in the vicinity of the boundary between the display region 101a and the frame region 101b, and improve uniformity of sensitivity in touch detection on the entire touch detection surface by driving the second drive electrode COML2A, each detection block of the first drive electrode COML1, and the second drive electrode COML2B in this order.

In the present embodiment, the first drive electrode COML1 also functions as a common electrode of the display panel 20, so that the control unit 11 supplies the first drive signal Vcom having a common potential for display driving to the first drive electrode COML1 selected via the drive electrode driver 14 in the display operation period $Pd_x$.

When the widths of the second drive electrodes COML2A, COML2B, COML2C, and COML2D are increased, the second drive electrodes COML2A, COML2B, COML2C, and COML2D tend to be influenced by variation in the electric field caused by a finger and the like in a contact state or a proximate state, so that sensitivity in touch detection is improved. The length in the extending direction of each of the second drive electrodes COML2A, COML2B, COML2C, and COML2D may be longer than the first drive electrode COML1. In the present embodiment, the width of each of the second drive electrodes COML2A, COML2B, COML2C, and COML2D is the length in a direction orthogonal to each side of the display region 101a. Similarly, the second drive electrodes COML2A and COML2B each preferably have a width larger than that of the first drive electrode COML1.

In FIG. 25, amplitude and a frequency of the second drive signal Vd are the same as those of the first drive signal Vcom. However, the embodiment is not limited thereto. The amplitude and the frequency of the second drive signal Vd may be different from those of the first drive signal Vcom.

Figure 26:
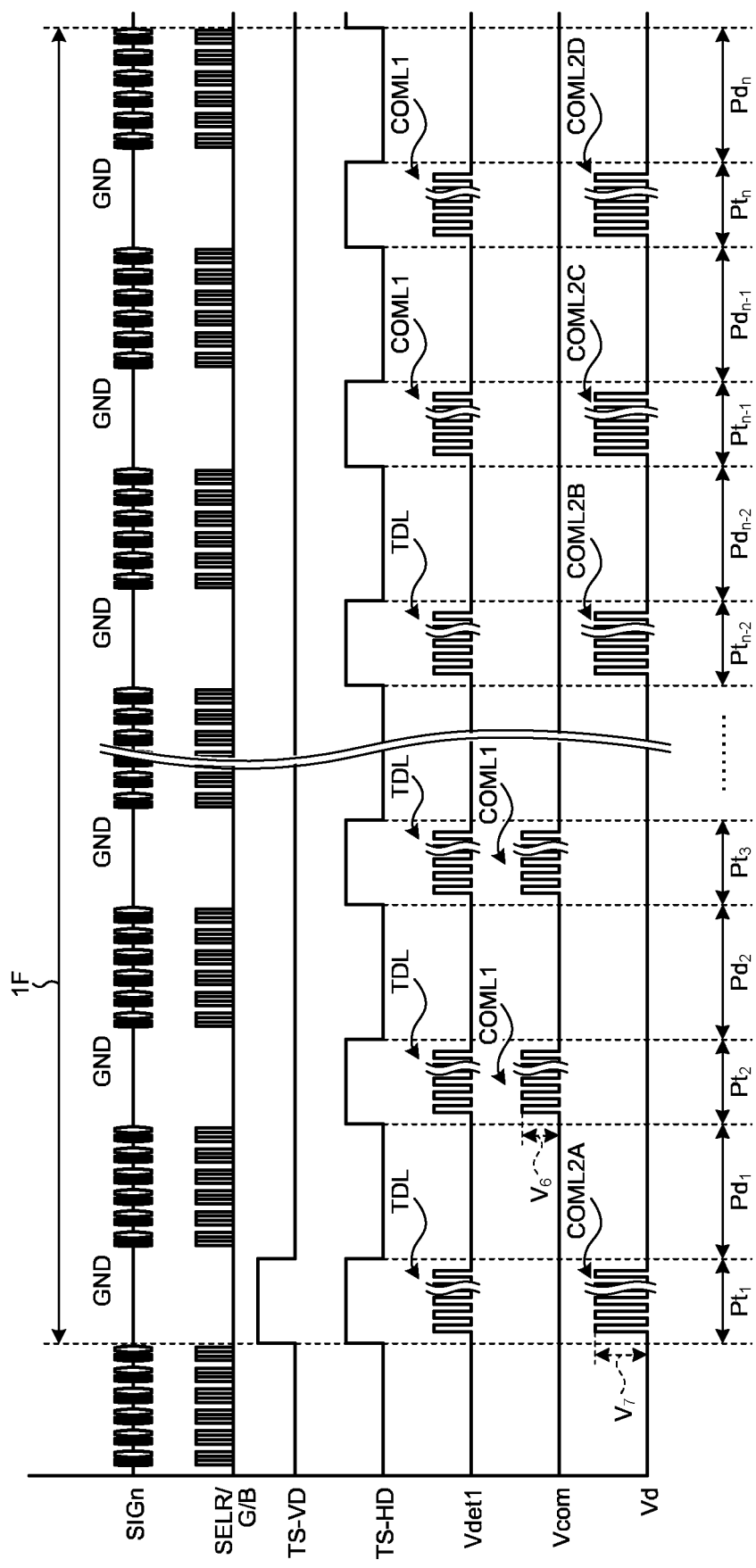
FIG. 26 is a timing waveform chart illustrating an operation example of a display device with a touch detection function according to a first modification of the first embodiment.

FIG. 26 is a timing waveform chart illustrating an operation example of the display device with a touch detection function according to a first modification of the first embodiment. A driving order of the first drive electrode COML1 and the second drive electrodes COML2A, COML2B, COML2C, and COML2D in FIG. 26 is the same as that in FIG. 25, but the amplitude of the second drive signal Vd is different therebetween. An electric potential $V_7$ of the second drive signal Vd is higher than an electric potential $V_6$ of the first drive signal Vcom. The second drive electrodes COML2A, COML2B, COML2C, and COML2D are arranged in the frame region 101b of the cover base material 51 that hardly influences video display, so that a desired signal can be supplied to the second drive electrodes COML2A, COML2B, COML2C, and COML2D without limitation as compared with the first drive electrode COML1 arranged on the TFT substrate 21. Thus, the electric potential $V_7$ of the second drive signal Vd can be caused to be higher than the electric potential $V_6$ of the first drive signal Vcom, and sensitivity in touch detection in the frame region 101b can be further improved. When a touch input on or to the frame region 101b, such as a touch input to a switch (a volume switch, an on-off switch, etc.) arranged in a frame region of a portable phone apparatus or the like, is detected with the touch detection electrode TDL in the display region 101a, the detection sensitivity may be lowered due to a long distance between the switch and the touch detection electrode TDL. Detection sensitivity in the frame region 101b can be significantly increased by increasing electric field intensity of the second drive electrodes COML2A, COML2B, COML2C, and COML2D.

The second drive electrodes COML2A, COML2B, COML2C, and COML2D are arranged at positions closer to the cover base material 51 than to the first drive electrode COML1 (not illustrated in FIG. 18), that is, positions closer to a finger and the like in a contact state or a proximate state. Thus, the second drive electrodes COML2A, COML2B, COML2C, and COML2D are preferably driven by the driving driver 48 (refer to FIG. 1) that is mounted on the touch detection IC 18 and different from the drive electrode driver 14, and also preferably driven with the second drive signal Vd having amplitude different from that of the first drive signal Vcom. Due to this, uniformity of sensitivity in touch detection can be improved.

Figure 27:
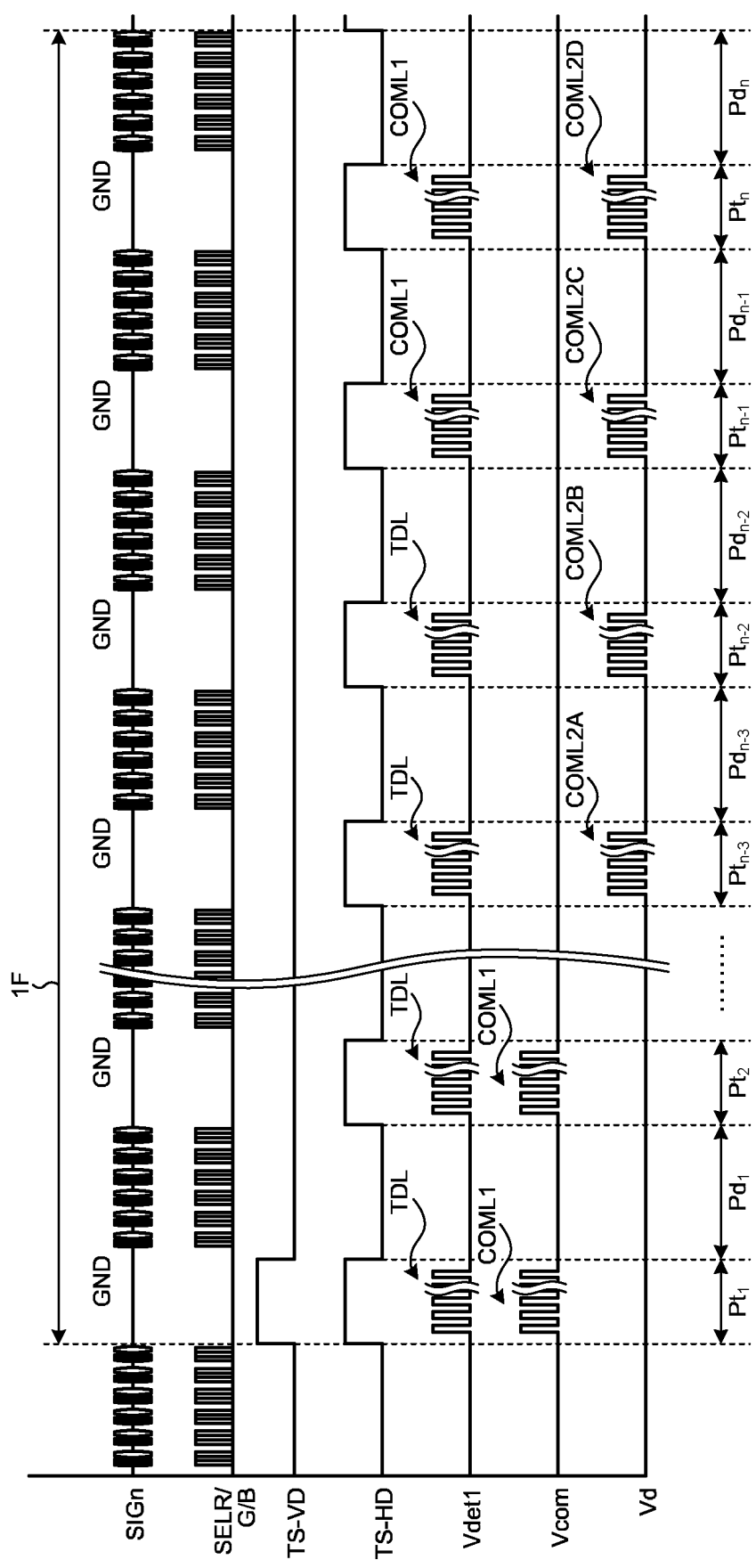
FIG. 27 is a timing waveform chart illustrating an operation example of a display device with a touch detection function according to a second modification of the first embodiment.

FIG. 27 is a timing waveform chart illustrating an operation example of the display device with a touch detection function according to a second modification of the first embodiment. As illustrated in FIG. 27, within one frame period (1F), touch detection in the frame region 101b is performed after touch detection in the display region 101a is performed. That is, after the first drive signal Vcom is successively supplied to the first drive electrode COML1, the second drive signal Vd is supplied to each of the second drive electrodes COML2A, COML2B, COML2C, and COML2D during the touch detection periods $Pt_{n-3}$ to $Pt_n$. In the touch detection period $Pt_{n-3}$ and the touch detection period $Pt_{n-2}$, the first touch detection signal Vdet1 is output from the touch detection electrode TDL. In the touch detection period $Pt_{n-1}$ and the touch detection period $Pt_n$, the first touch detection signal Vdet1 is output from the first drive electrode COML1. In this way, by successively arranging the touch detection period in the frame region 101b, sensitivity in touch detection in the frame region 101b can be improved.

Figure 28:
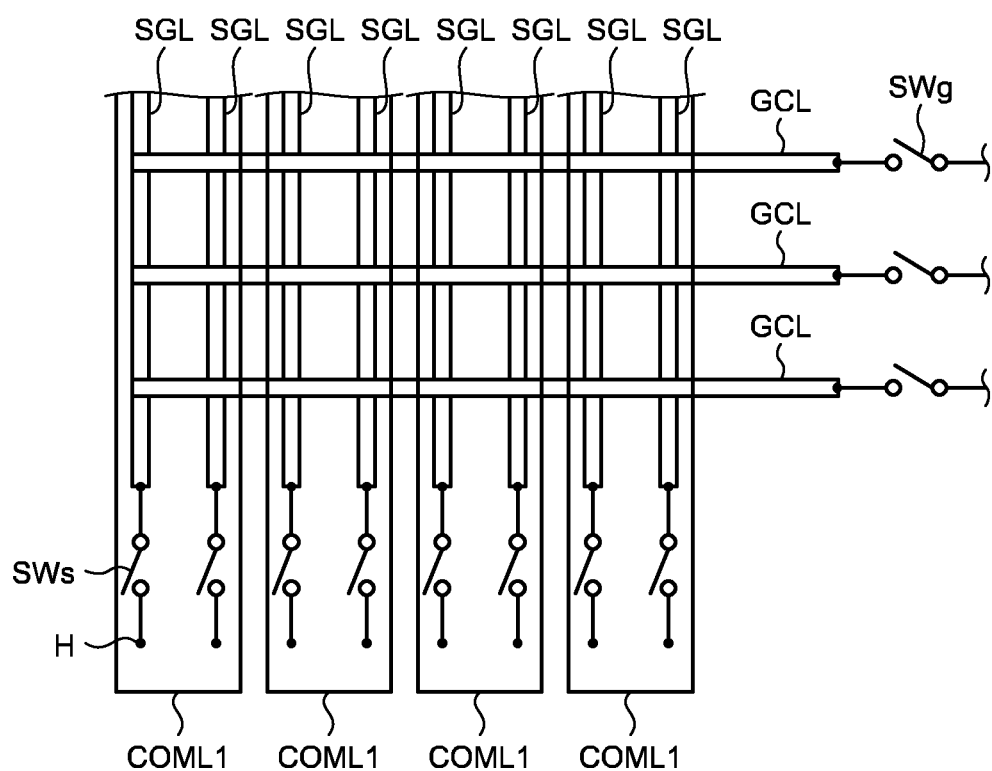
FIG. 28 is a plan view schematically illustrating a pixel signal line and a scanning signal line of a display device with a touch detection function according to a third modification of the first embodiment.

FIG. 28 is a plan view schematically illustrating the pixel signal line and the scanning signal line of the display device with a touch detection function according to a third modification of the first embodiment. As illustrated in FIGS. 23 and 24, the first drive electrode COML1 is used as a detection electrode, and touch detection is performed based on a change in capacitance between the first drive electrode COML1 and the second drive electrodes COML2C and COML2D. In this case, the capacitance between the first drive electrode COML1 and the second drive electrodes COML2C and COML2D is increased, and the first touch detection signal Vdet1 is not responsively output from the first drive electrode COML1 in some cases.

As illustrated in FIG. 28, a plurality of switches SWg are arranged for coupling the respective scanning signal lines GCL to the gate driver 12. A plurality of switches SWs are arranged for coupling the respective pixel signal lines SGL to the respective first drive electrodes COML1. In the touch detection periods $Pt_{n-1}$ and $Pt_n$ illustrated in FIG. 25, the switch SWg and the switch SWs are caused to be in the OFF state, and the scanning signal line GCL and the pixel signal line SGL are caused to be in a floating state. This configuration can prevent capacitive coupling between the first drive electrode COML1 and the scanning signal line GCL and between the first drive electrode COML1 and the pixel signal line SGL, and prevent detection sensitivity from being lowered. In this case, the "floating state" indicates a state in which a fixed electric potential is not given.

Figure 29:
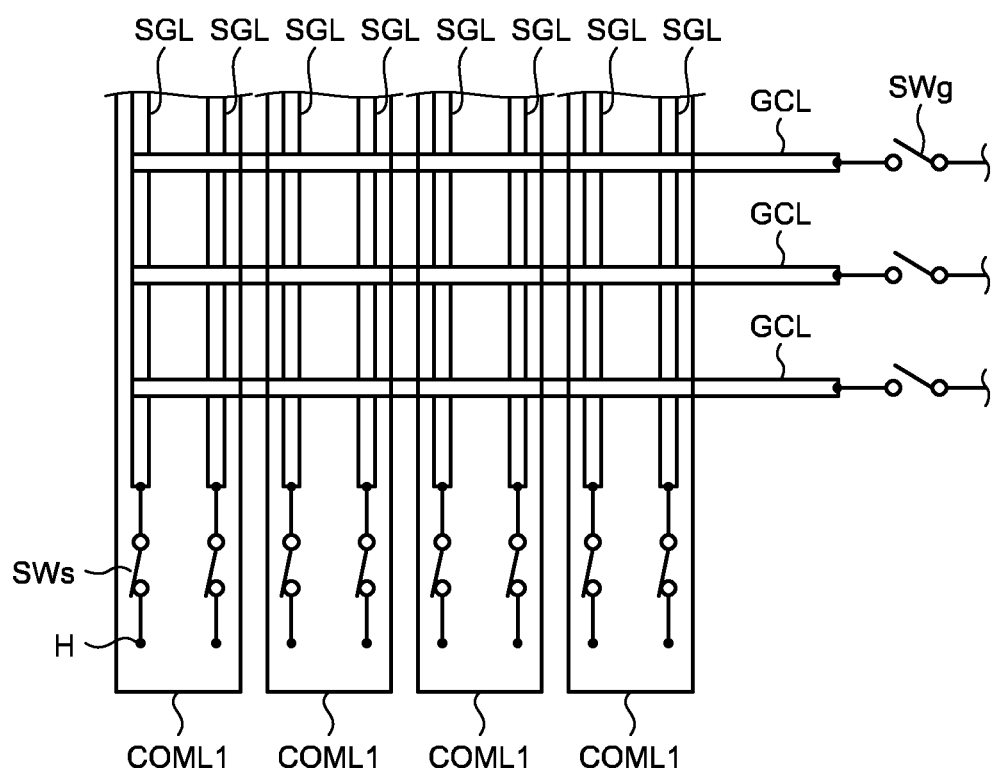
FIG. 29 is a plan view schematically illustrating a pixel signal line and a scanning signal line of a display device with a touch detection function according to a fourth modification of the first embodiment.

FIG. 29 is a plan view schematically illustrating the pixel signal line and the scanning signal line of the display device with a touch detection function according to a fourth modification of the first embodiment. When the first drive electrode COML1 is used as the detection electrode, the switch SWg is caused to be in the OFF state, and the scanning signal line GCL is caused to be in the floating state. The switch SWs is then caused to be in the ON state to electrically couple the pixel signal line SGL to the first drive electrode COML1. The pixel signal line SGL is made of metallic material having electrical conductivity higher than that of the first drive electrode COML1, so that an apparent resistance value of the first drive electrode COML1 can be reduced by coupling the pixel signal line SGL to the first drive electrode COML1. This configuration can prevent detection sensitivity from being lowered.

Second Embodiment

Figure 30:
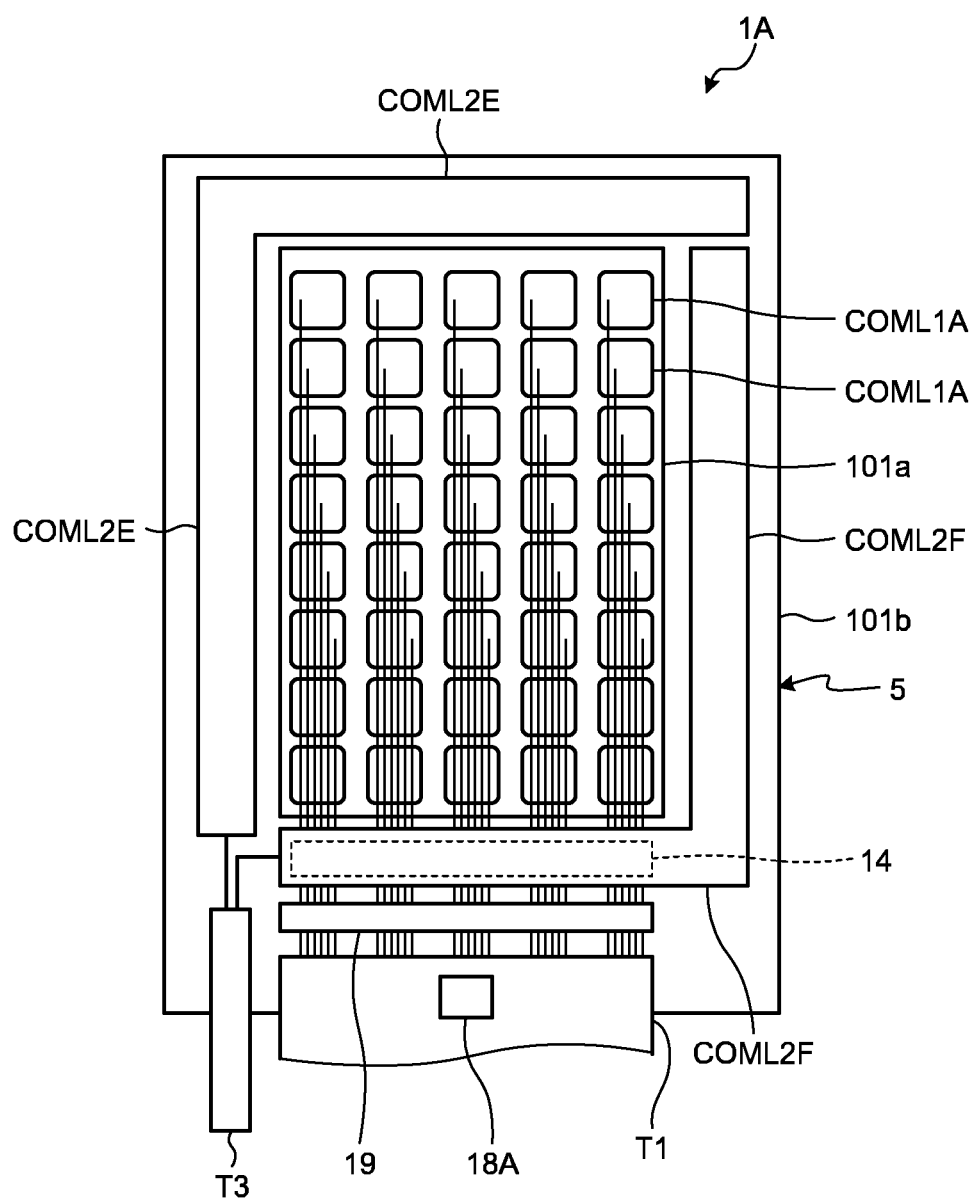
FIG. 30 is a plan view schematically illustrating a display device with a touch detection function according to a second embodiment.

FIG. 30 is a plan view schematically illustrating the display device with a touch detection function according to a second embodiment. In the display device with a touch detection function according to the first embodiment, as illustrated in FIG. 17, the first drive electrode COML1 extends along the long side of the display region 101a. However, the embodiment is not limited thereto. As illustrated in FIG. 30, in a display device 1A with a touch detection function according to the second embodiment, a plurality of rectangular first drive electrodes COML1A are arranged in the display region 101a of the TFT substrate (refer to FIG. 17). The first drive electrodes COML1A are individual electrodes arranged at intervals in a matrix. Pieces of wiring are drawn out from the respective first drive electrodes COML1A, and the first drive electrodes COML1A are coupled to the drive electrode driver 14 via the pieces of wiring.

An arrangement of the wiring is not limited. The wiring may be arranged in a layer different from that of the first drive electrode COML1A via an insulating layer, or arranged between the first drive electrodes COML1A in the same layer as the first drive electrode COML1A.

In a touch detection operation in the display region 101a, the first drive signal Vcom is supplied from the drive electrode driver 14 to the first drive electrodes COML1A, and a second touch detection signal Vdet2 is output from the first drive electrode COML1A in accordance with the basic principle of self-capacitive touch detection described above. By independently performing touch detection on each of the first drive electrodes COML1A arranged in a matrix, touch panel coordinates where a finger and the like are brought into contact with or proximate to can be detected.

As illustrated in FIG. 30, second drive electrodes COML2E and COML2F are arranged in the frame region 101b of the covering member 5. The second drive electrode COML2E is configured such that a portion extending along the long side (left side) of the display region 101a is coupled to a portion extending along the short side (upper side) of the display region 101a. The second drive electrode COML2E continuously extends from the upper side to the left side of the frame region 101b. The second drive electrode COML2F is configured such that a portion extending along the long side (right side) of the display region 101a is coupled to a portion extending along the short side (lower side) of the display region 101a. The second drive electrode COML2F continuously extends from the left side to the lower side of the frame region 101b.

The flexible substrate T3 is coupled to the frame region 101b of the covering member 5. The second drive electrodes COML2E and COML2F are coupled to the flexible substrate T3 via short pieces of wiring. The flexible substrate T1 is coupled to the TFT substrate 21 of the pixel substrate 2. A touch detection IC 18A is mounted on the flexible substrate T1. The flexible substrate T3 can be coupled to the flexible substrate T1 via a connector (not illustrated). Thus, the second drive signal Vd is supplied to the second drive electrodes COML2E and COML2F from the driving driver 48 mounted on the touch detection IC 18A. In accordance with the basic principle of mutual-capacitive touch detection described above, the first touch detection signal Vdet1 is output from the first drive electrode COML1A based on a change in capacitance between the first drive electrode COML1A and the second drive electrodes COML2E and COML2F. Accordingly, a display device 1C with a touch detection function can detect a finger and the like that are brought into contact with or proximate to the frame region 101b.

Figure 31:
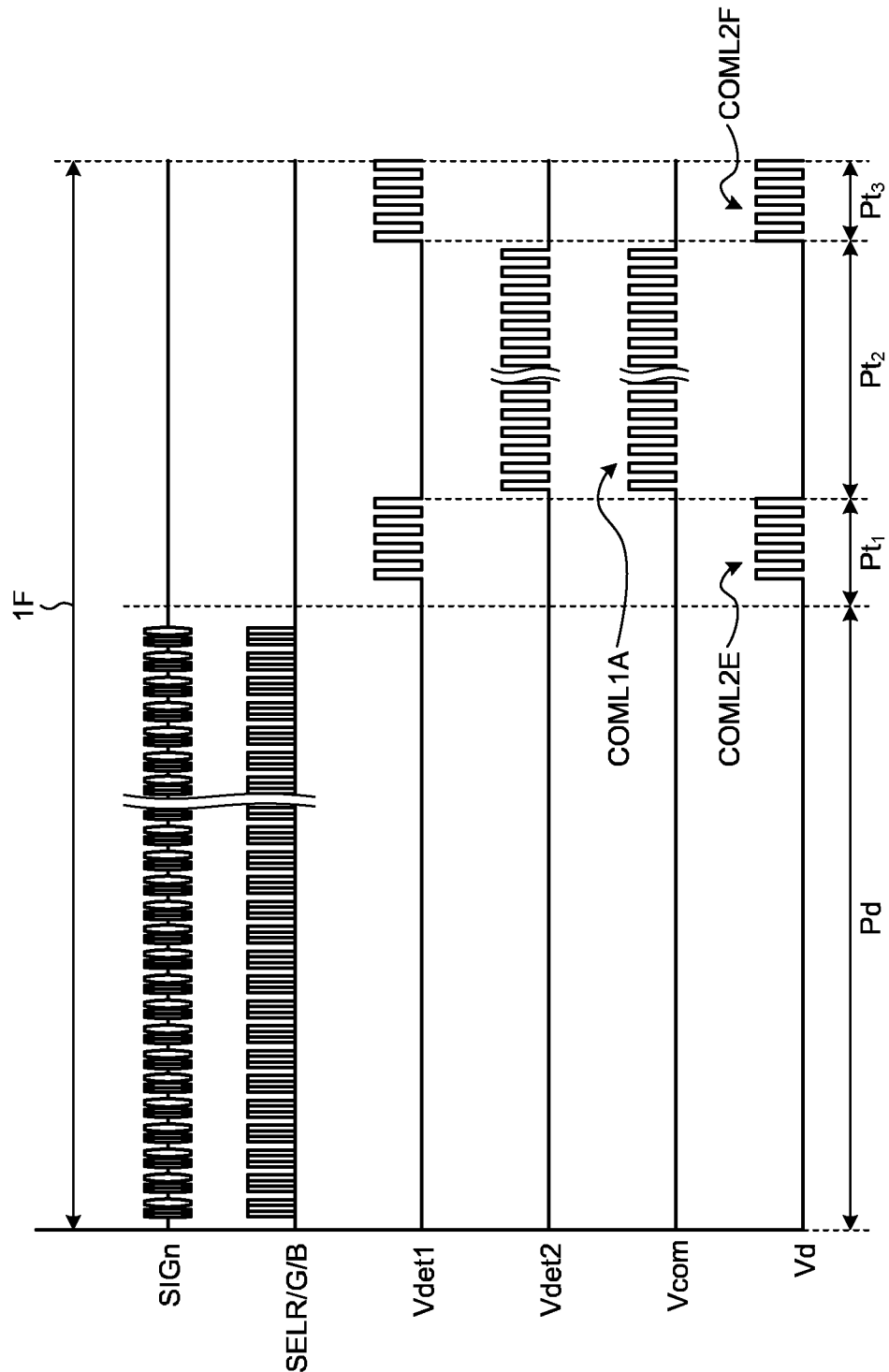
FIG. 31 is a timing waveform chart illustrating an operation example of the display device with a touch detection function according to the second embodiment.

FIG. 31 is a timing waveform chart illustrating an operation example of the display device with a touch detection function according to the second embodiment. As illustrated in FIG. 31, the control unit 11 performs a display operation of an image corresponding to one frame in a display operation period Pd. In the display operation, the first drive electrode COML1A functions as a common electrode that gives a common potential to a plurality of pixel electrodes 22 of the display panel 20.

After the display operation period Pd, the control unit 11 performs a mutual-capacitive touch detection operation in the touch detection periods $Pt_1$ and $Pt_3$, and performs a self-capacitive touch detection operation in the touch detection period $Pt_2$. In the touch detection period $Pt_1$, the driving driver 48 supplies the second drive signal Vd to the second drive electrode COML2E, and the first drive electrode COML1A outputs the first touch detection signal Vdet1. In the touch detection period $Pt_2$, the drive electrode driver 14 supplies first drive signals Vcom to the first drive electrodes COML1A at the same time, and the first drive electrodes COML1A output second touch detection signals Vdet2. In the touch detection period $Pt_3$, the driving driver 48 supplies the second drive signal Vd to the second drive electrode COML2F, and the first drive electrode COML1A outputs the first touch detection signal Vdet1.

In this way, in one frame period (1F), the touch detection operation is performed in the display region 101a and the frame region 101b. Self-capacitive touch detection is performed in the display region 101a, and mutual-capacitive touch detection is performed in the frame region 101b. Due to this, detection accuracy in the frame region 101b can be improved. Also in this embodiment, the second drive electrodes COML2E and COML2F are arranged in the covering member 5, so that touch detection in the frame region 101b can be performed while preventing the width of the frame region 101b from being increased.

Figure 32:
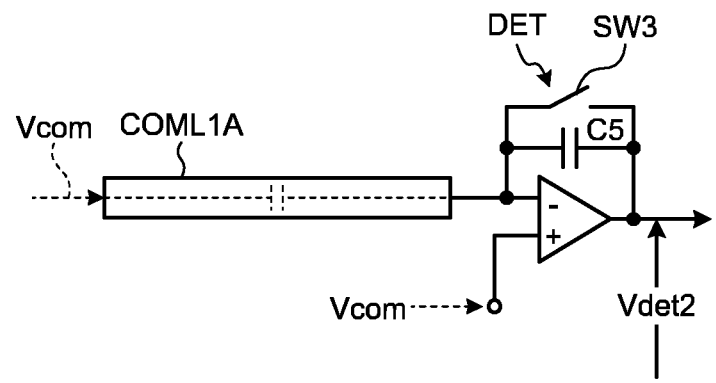
FIG. 32 is an explanatory diagram illustrating an example of an equivalent circuit of self-capacitive touch detection according to the second embodiment.
Figure 33:
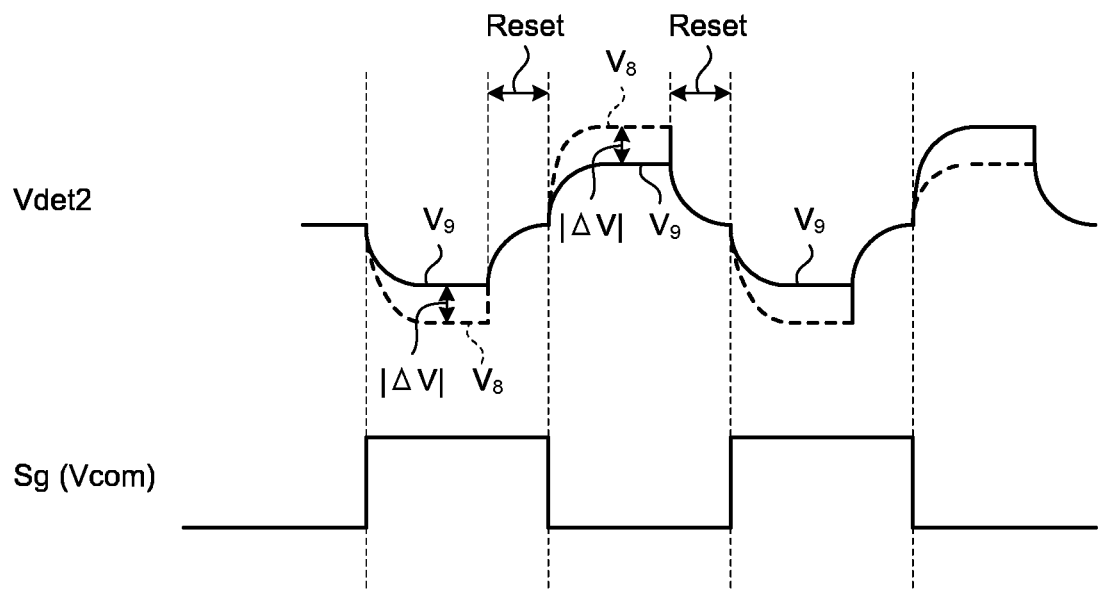
FIG. 33 is a diagram illustrating an example of waveforms of a drive signal and a touch detection signal in self-capacitive touch detection according to the second embodiment.

FIG. 32 is an explanatory diagram illustrating an example of an equivalent circuit of self-capacitive touch detection according to the second embodiment. FIG. 33 is a diagram illustrating an example of waveforms of the drive signal and the touch detection signal in self-capacitive touch detection according to the second embodiment. The equivalent circuit in FIG. 32 is different from that illustrated in FIG. 11 in that the voltage detector DET is coupled to the first drive electrode COML1A without the switches SW1 and SW2. In the voltage detector DET illustrated in FIG. 32, the first drive electrode COML1A is coupled to an inverting input terminal (−), and the first drive signal Vcom is input to a non-inverting input terminal (+). The voltage detector DET in FIG. 32 does not require the switches SW1 and SW2, and the first drive signal Vcom is directly supplied to the first drive electrode COML1A.

When a conductor such as a finger is proximate to or brought into contact with the first drive electrode COML1A and capacitance of the first drive electrode COML1A is increased, a current corresponding to a difference voltage with respect to the first drive signal Vcom flows from the first drive electrode COML1A to an output side. The voltage detector DET converts the current into a voltage, integrates the converted voltage, and output the integrated voltage. A value obtained by converting the current into a voltage to be integrated is output to the voltage detector DET. The switch SW3 is caused to be in an ON (open) state when touch detection is performed, and caused to be in an OFF (closed) state when touch detection is not performed to perform a reset operation of the voltage detector DET. When the voltage detector DET is used for both of mutual-capacitive touch detection and self-capacitive touch detection, the voltage detector DET is switched so that the reference voltage Vref is input to the non-inverting input terminal (+) in mutual-capacitive touch detection, and so that the first drive signal Vcom is input to the non-inverting input terminal (+) in self-capacitive touch detection.

As illustrated in FIG. 33, amplitude of variation in the voltage when the finger is in a contact state or a proximate state (a waveform $V_8$ of a dotted line) is larger than that of variation in the voltage when the finger is in a non-contact state or a non-proximate state (a waveform $V_9$ of a solid line). Accordingly, an absolute value $|\Delta V|$ of a voltage difference between the waveform $V_8$ and the waveform $V_9$ varies depending on influence of a conductor such as a finger that is brought into contact with or proximate to the touch panel from the outside. In this way, touch detection may be performed based on self capacitance of the first drive electrode COML1A.

In the present embodiment, the touch detection periods $Pt_1$, $Pt_2$, and $Pt_3$ are arranged after the display operation period Pd for performing a display operation for one frame. Alternatively, a plurality of display operation periods and touch detection periods may be alternately arranged. In this case, the touch detection period may be divided into four or more parts to be arranged. In the present embodiment, a touch detection operation is performed with a plurality of first drive electrodes COML1A, so that the touch detection electrodes TDL in the counter substrate 3 illustrated in FIG. 13 are not necessarily arranged. Alternatively, the touch detection electrode TDL may be arranged in the counter substrate 3, and mutual-capacitive touch detection and self-capacitive touch detection may be switched to be performed in the touch detection operation in the display region 101a. Although two second drive electrodes COML2E and COML2F are arranged in the above described configuration, four second drive electrodes may be arranged similarly to FIG. 13.

Figure 34:
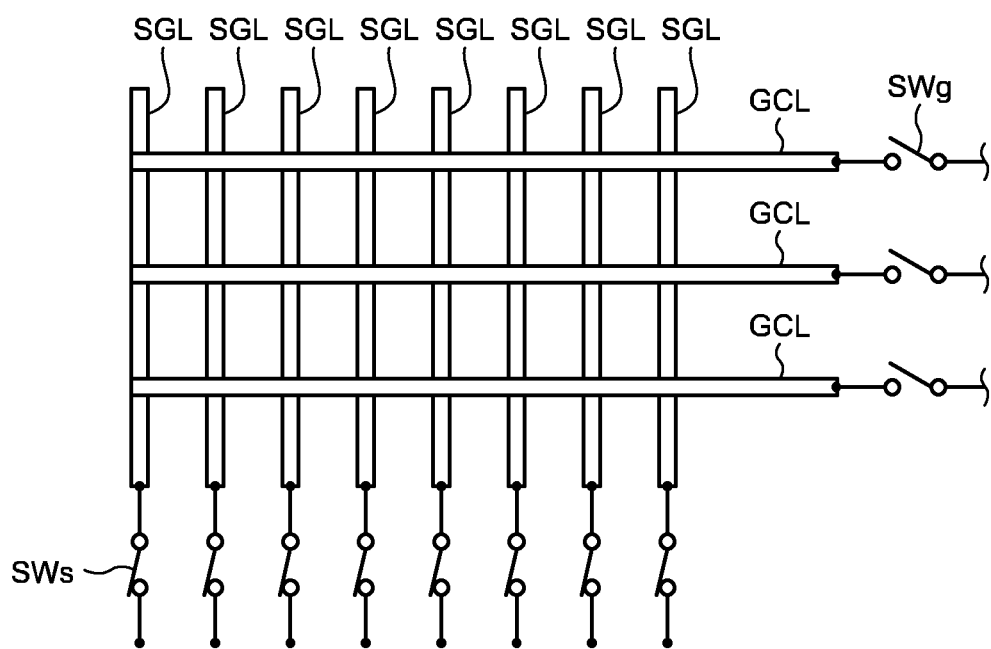
FIG. 34 is a plan view schematically illustrating a pixel signal line and a scanning signal line of the display device with a touch detection function according to the second embodiment.
Figure 35:
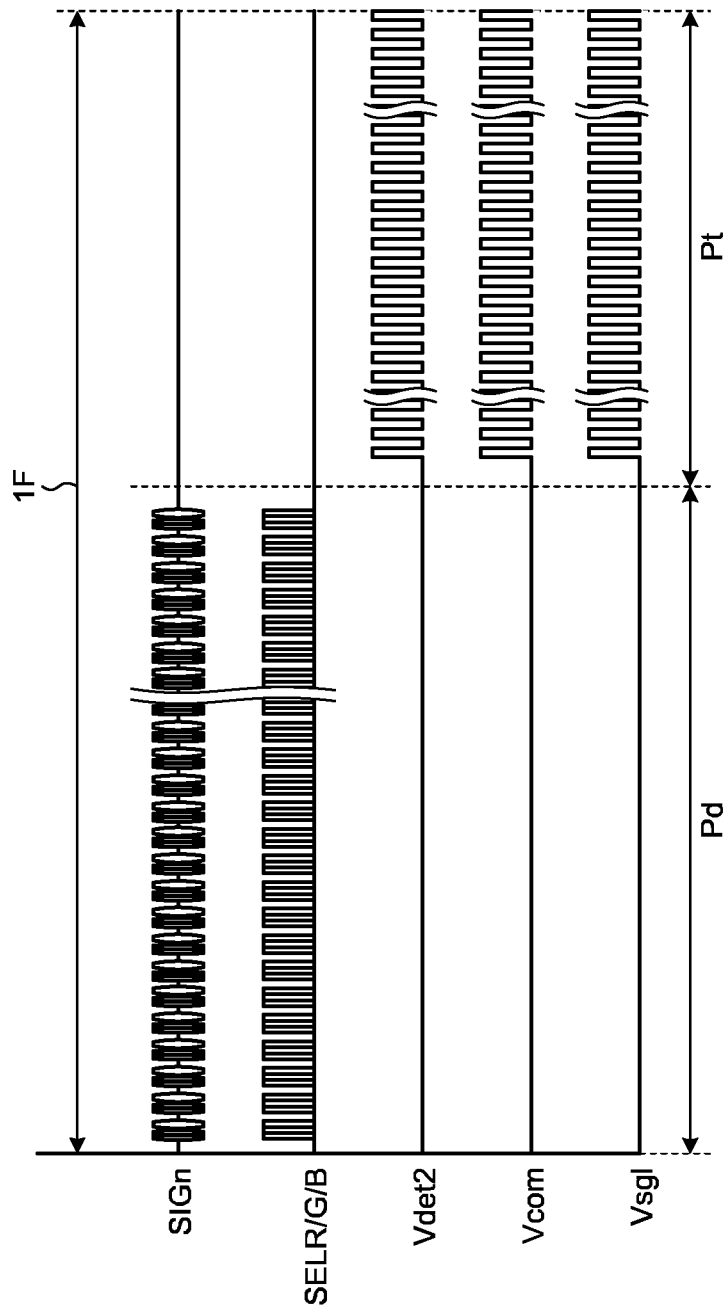
FIG. 35 is a timing waveform chart illustrating an operation example of the display device with a touch detection function according to the second embodiment.

Next, the following describes a method of reducing parasitic capacitance in the self-capacitive touch detection operation. FIG. 34 is a plan view schematically illustrating the pixel signal line and the scanning signal line of the display device with a touch detection function according to the second embodiment. FIG. 35 is a timing waveform chart illustrating an operation example of the display device with a touch detection function according to the second embodiment.

The first drive electrode COML1A is arranged in the proximity of the scanning signal line GCL and the pixel signal line SGL. Due to this, parasitic capacitance between the first drive electrode COML1A and the scanning signal line GCL, and parasitic capacitance between the first drive electrode COML1A and the pixel signal line SGL are increased. The first drive electrode COML1A cannot be driven with a responsive waveform in some cases due to the parasitic capacitance. An error in the touch detection signal may be caused by fluctuation of the parasitic capacitance, and detection sensitivity may be lowered.

As illustrated in FIG. 34, a plurality of switches SWg are arranged for coupling the respective scanning signal lines GCL to the gate driver 12 (refer to FIG. 17). A plurality of switches SWs are arranged for coupling the respective pixel signal lines SGL to the source driver 13. In the touch detection period Pt illustrated in FIG. 35, the switch SWg coupled to the scanning signal line GCL is caused to be in the OFF state to cause the scanning signal line GCL to be in a floating state. In the touch detection period Pt, the switch SWs coupled to the pixel signal line SGL is caused to be in the ON state. As illustrated in FIG. 35, a signal Vsgl synchronized with the first drive signal Vcom and having the same waveform is input to the pixel signal line SGL. Accordingly, the parasitic capacitance between the first drive electrode COML1A and the pixel signal line SGL can be reduced, and the first drive electrode COML1A can be driven with a desired waveform.

The pixel signal line SGL to which the signal Vsgl synchronized with the first drive signal Vcom is input is preferably driven being electrically coupled to the first drive electrode COML1A. The first drive electrode COML1A is made of a translucent conductive material such as ITO, so that the first drive electrode COML1A has a resistance higher than that of the pixel signal line SGL made of a metallic material. When the pixel signal line SGL and the first drive electrode COML1A are electrically coupled to each other to be driven, a total resistance value of the pixel signal line SGL and the first drive electrode COML1A is reduced, which is advantageous to power consumption and the like. The signal Vsgl may be input to the pixel signal line SGL that does not correspond to the first drive electrode COML1A to which the first drive signal Vcom is input. The signal Vsgl is preferably synchronized with the first drive signal Vcom or the second drive signal Vd and has the same waveform. Alternatively, the signal Vsgl may have a waveform having amplitude different from that of the first drive signal Vcom or the second drive signal Vd, the waveform in which an electric potential at high level and an electric potential at low level are shifted from each other.

Figure 36:
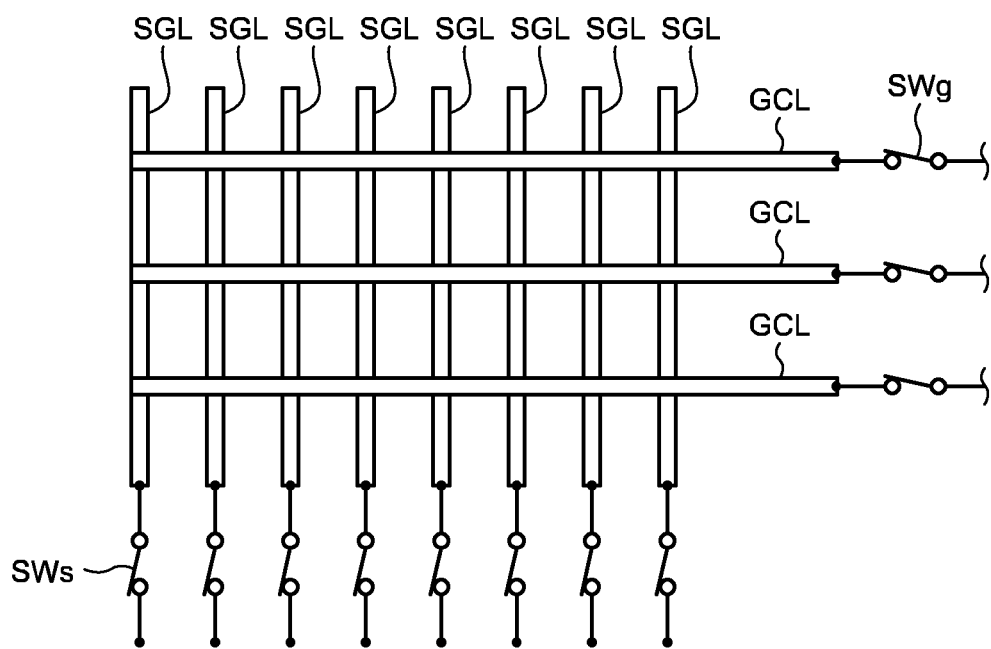
FIG. 36 is a plan view schematically illustrating a pixel signal line and a scanning signal line of a display device with a touch detection function according to a modification of the second embodiment.
Figure 37:
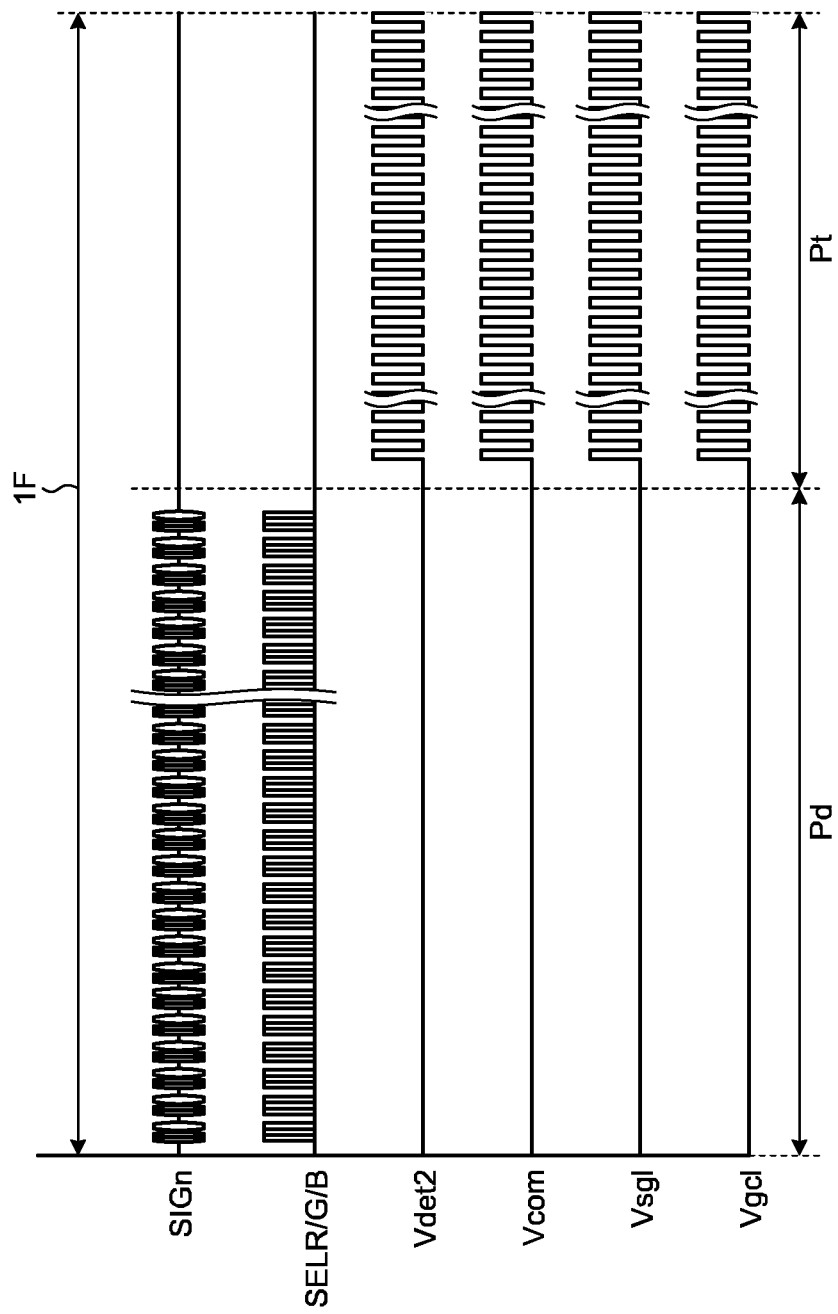
FIG. 37 is a timing waveform chart illustrating an operation example of the display device with a touch detection function according to the modification of the second embodiment.

Next, the following describes another method of reducing the parasitic capacitance in the self-capacitive touch detection operation with reference to FIGS. 36 and 37. FIG. 36 is a plan view schematically illustrating the pixel signal line and the scanning signal line of the display device with a touch detection function according to a modification of the second embodiment. FIG. 37 is a timing waveform chart illustrating an operation example of the display device with a touch detection function according to the modification of the second embodiment.

In the touch detection period Pt, the switch SWg coupled to the scanning signal line GCL is caused to be in the ON state, and the switch SWs coupled to the pixel signal line SGL is caused to be in the ON state. That is, the scanning signal line GCL and the pixel signal line SGL are not caused to be in the floating state. As illustrated in FIG. 37, signals Vgcl and Vsgl synchronized with the first drive signal Vcom and having the same waveform are input to the scanning signal line GCL and the pixel signal line SGL. Accordingly, the parasitic capacitance between the first drive electrode COML1A and the scanning signal line GCL is reduced, and the parasitic capacitance between the first drive electrode COML1A and the pixel signal line SGL is reduced. Thus, the first drive electrode COML1A can be driven with a desired waveform. The signal Vgcl supplied to the scanning signal line GCL has a waveform of a voltage at which a TFT element Tr illustrated in FIG. 15 can be kept in the OFF state. This configuration prevents display quality from being deteriorated when the TFT element arranged for each sub-pixel SPix is caused to be in the ON state and leakage is caused.

The preferred embodiments of the present invention have been described above. However, the present invention is not limited thereto. Content disclosed in the embodiments is merely an example, and various modifications can be made without departing from the gist of the invention. The present invention naturally encompasses an appropriate modification maintaining the gist of the invention.

For example, described is a case in which the first drive electrode also functions as the common electrode of the display panel. However, the embodiment is not limited thereto. The display device with a touch detection function may be configured such that a common electrode is arranged on the display panel, and the touch panel is mounted on the display panel. The shape, the arrangement, the number, and the like of the second drive electrode arranged on the cover base material may be appropriately changed. For example, although the second drive electrode is arranged to surround four sides of the display region in the above embodiments, the second drive electrode may not be arranged for one of the four sides.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The application is claimed as follows:

1. A display device with a touch detection function comprising:
    a first substrate;

a second substrate opposed to the first substrate;
a plurality of pixel electrodes overlapping a display region of the first substrate;
a plurality of detection electrodes arranged on the second substrate;
a cover base material that is opposed to the second substrate and that has a frame region outside the display region on a plane parallel with the cover base material; and
a first touch electrode that is arranged under the cover base material and between a side edge of the cover base material and an outer circumference of the display region and that has:
  a first electrode part that is longitudinal in a first direction along a whole length of the display region in which the pixel electrodes are arranged, and
  a second electrode part that is longitudinal in a second direction crossing the first direction, along a whole length of the display region in the second direction, the first electrode part and the second electrode part being connected under a corner of the cover base material,
wherein the first touch electrode extends in parallel with a side of the frame region of the cover base material,
wherein proximity or contact of an object with respect to the frame region is detected based on a change in capacitance the first touch electrode, and
wherein a pair of the first touch electrodes, each including the first electrode part extending along the whole length of the display region in the first direction and the second electrode part extending along the whole length of the display region in the second direction, is disposed without overlapping the pixel electrodes and the detection electrodes, under the cover base material.

2. The display device with a touch detection function according to claim 1, further comprising
a plurality of second touch electrodes disposed in the display region of the first substrate,
wherein an insulating layer is disposed between the pixel electrodes and the second touch electrodes.

3. The display device with a touch detection function according to claim 2, further comprising:
a first driving unit that outputs a first drive signal to the first touch electrode; and
a second driving unit that outputs a second drive signal to the second touch electrodes, wherein
the first driving unit and the second driving unit operate independently.

4. The display device with a touch detection function according to claim 3, wherein an electric potential of the first drive signal is higher than an electric potential of the second drive signal.

5. The display device with a touch detection function according to claim 4,
wherein proximity or contact of an object with respect to the display region is detected based on capacitance between the detection electrodes and the second touch electrodes.

6. The display device with a touch detection function according to claim 5, wherein one-dimensional coordinates of an object that is proximate to or brought into contact with the frame region are detected based on a change in capacitance between the detection electrodes and the first touch electrode.

7. The display device with a touch detection function according to claim 5, wherein the first touch electrode does not overlap the detection electrodes.

8. A display device with a touch detection function comprising:
a first substrate;
a second substrate opposed to the first substrate;
a plurality of pixel electrodes overlapping a display region of the first substrate;
a cover base material that is opposed to the second substrate and that has a frame region outside the display region on a plane parallel with the cover base material;
a plurality of detection electrodes arranged on the second substrate, and
a first touch electrode that is arranged under the cover base material and between a side edge of the cover base material and an outer circumference of the display region in which the pixel electrodes are arranged,
wherein the first touch electrode extends in parallel with a side of the frame region of the cover base material,
wherein one-dimensional coordinates of an object that is proximate to or brought into contact with the frame region are detected based on a change in capacitance between the detection electrodes and the first touch electrode that is longitudinal in a first direction along a whole length of the display region and that is disposed under the cover base material, without overlapping detection electrodes and the pixel electrodes.

* * * * *